United States Patent
Iida et al.

(10) Patent No.: US 6,612,497 B1
(45) Date of Patent: Sep. 2, 2003

(54) TWO-DIMENSIONAL-CODE RELATED METHOD, APPARATUS, AND RECORDING MEDIUM

(75) Inventors: Masahiro Iida, Kariya (JP); Hisashi Shigekusa, Okazaki (JP); Kensaku Harada, Chita (JP); Tadao Nojiri, Oobu (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 09/449,736

(22) Filed: Nov. 26, 1999

(30) Foreign Application Priority Data

Nov. 27, 1998 (JP) .......................... 10-337772
Jun. 4, 1999 (JP) .......................... 11-158001

(51) Int. Cl.$^7$ .................. G02B 26/10; G06K 7/10; G06K 9/22; G06K 19/06
(52) U.S. Cl. ................ 235/462.25; 235/462.08; 235/462.09
(58) Field of Search ................ 235/462.09, 462.08, 235/462.25

(56) References Cited

U.S. PATENT DOCUMENTS

| | | | | |
|---|---|---|---|---|
| 5,134,272 A | * | 7/1992 | Tsuchiya et al. | ........ 235/462.08 |
| 5,408,543 A | | 4/1995 | Yoshida | ........................ 382/61 |
| 5,410,620 A | | 4/1995 | Yoshida | ........................ 382/61 |
| 5,512,739 A | * | 4/1996 | Chandler et al. | ...... 235/462.09 |
| 5,525,787 A | * | 6/1996 | Kubo | ..................... 235/462.09 |
| 5,659,167 A | * | 8/1997 | Wang et al. | ............ 235/472.01 |
| 5,736,724 A | * | 4/1998 | Ju et al. | ................. 235/462.11 |
| 6,360,948 B1 | * | 3/2002 | Yang et al. | ............... 235/462.1 |

FOREIGN PATENT DOCUMENTS

JP          2742555          2/1998

* cited by examiner

*Primary Examiner*—Karl D. Frech
(74) *Attorney, Agent, or Firm*—Harness, Dickey & Pierce, PLC

(57) ABSTRACT

An image of a region is taken which includes a two-dimensional code. A two-dimensional code area is determined in the image. The two-dimensional code area corresponds to the two-dimensional code. Inspection lines are set which connect opposite sides in two pairs among four sides indicating boundaries of the two-dimensional code area in cases where the two-dimensional code is of a cell matrix type. Inspection lines are set which connect opposite sides in one pair among four sides indicating boundaries of the two-dimensional code area in cases where the two-dimensional code is of a bar-code stack type. Information is read from the two-dimensional code area on the basis of the inspection lines. Division points are set on the opposite sides in response to a ratio in length between sides adjacent to the opposite sides and a number of arrangements of cells in the two-dimensional code in cases where the two-dimensional code is of the cell matrix type. Division points are set on the opposite sides in response to a ratio in length between sides adjacent to the opposite sides and a number of stacked bar codes in the two-dimensional code in cases where the two-dimensional code is of the bar-code stack type. The inspection lines are set which connect corresponding ones of the division points.

11 Claims, 13 Drawing Sheets

TWO-DIMENSIONAL-CODE RELATED METHOD, APPARATUS, AND RECORDING MEDIUM

BACKGROUND OF THE INVENTION

1. Field of the Invention

This invention relates to a method of reading a two-dimensional code. Also, this invention relates to an apparatus for reading a two-dimensional code. In addition, this invention relates to a recording medium storing a computer program which concerns a two-dimensional code.

2. Description of the Related Art

A two-dimensional code is able to represent a great amount of information in comparison with a typical bar code. On the other hand, reading a two-dimensional code tends to take a longer time than reading a typical bar code.

There is a two-dimensional code composed of cells representing unit pieces of information respectively. Each of the cells is "white" assigned to a first logic state of a unit information piece, or "black" assigned to a second logic state of the unit information piece. Here, "white" and "black" correspond to "bright" and "dark" respectively. An apparatus for reading such a two-dimensional code includes a section for determining whether each cell is white or black. For the determining section, it is important to decide the position of the center of each cell.

U.S. Pat. No. 5,408,543 and U.S. Pat. No. 5,410,620 which correspond to Japanese Patent No. 2742555 disclose a system and method for locating and reading digital data in data regions within a data field disposed on a surface of an object to be identified. The system and method in U.S. Pat. No. 5,408,543 and U.S. Pat. No. 5,410,620 include the capability of compensating for optical or physical distortions of the data field as viewed by an optical reader. The data field is defined by X-axis and Y-axis intersecting basic lines disposed at a predetermined angle with respect to each other and a corner mark disposed on the opposite side of the data field from those basic lines. A plurality of position marks for marking predetermined distances between a plurality of imaginary X and Y axis internal lines are also provided. The positions of the imaginary X-axis internal lines within the data field are determinable from their spacings and angles with respect to the Y-axis basic line. The positions of the imaginary Y-axis internal lines are determinable from their spacings and their angles with respect to the X-axis basic line. The locations of the points of intersection of the imaginary X and Y axis internal lines are calculated in order to define data regions within the data field. The system and method compensate for optical and physical distortions of the locations of the X and Y axis basic lines, corner mark and position marks at the time of reading the data in order to accurately locate positions of the data regions within the data field.

SUMMARY OF THE INVENTION

It is a first object of this invention to provide an improved method of reading a two-dimensional code.

It is a second object of this invention to provide an improved apparatus for reading a two-dimensional code.

It is a third object of this invention to provide a recording medium storing an improved computer program which concerns a two-dimensional code.

A first aspect of this invention provides a method of reading a two-dimensional code. The method comprises the steps of taking an image of a region including the two-dimensional code; determining a two-dimensional code area in the image, the two-dimensional code area corresponding to the two-dimensional code; setting inspection lines connecting opposite sides in two pairs among four sides indicating boundaries of the two-dimensional code area in cases where the two-dimensional code is of a cell matrix type, and setting inspection lines connecting opposite sides in one pair among four sides indicating boundaries of the two-dimensional code area in cases where the two-dimensional code is of a bar-code stack type; and reading information from the two-dimensional code area on the basis of the inspection lines. The inspection-line setting step comprises setting division points on the opposite sides in response to a ratio in length between sides adjacent to the opposite sides and a number of arrangements of cells in the two-dimensional code in cases where the two-dimensional code is of the cell matrix type, setting division points on the opposite sides in response to a ratio in length between sides adjacent to the opposite sides and a number of stacked bar codes in the two-dimensional code in cases where the two-dimensional code is of the bar-code stack type, and setting the inspection lines which connect corresponding ones of the division points.

A second aspect of this invention provides a method of reading a two-dimensional code of a cell matrix type. The method comprises the steps of taking an image of a region including the two-dimensional code; determining a two-dimensional code area in the image, the two-dimensional code area corresponding to the two-dimensional code; setting inspection lines connecting opposite sides in two pairs among four sides indicating boundaries of the two-dimensional code area; and reading information from the two-dimensional code area on the basis of the inspection lines. The inspection-line setting step comprises detecting a specified pattern in the two-dimensional code area, calculating positions of centers of given cells in the two-dimensional code on the basis of the specified pattern, setting the calculated center positions as division points on first one of the opposite sides, setting division points on second one of the opposite sides in response to a ratio in length between sides adjacent to the opposite sides and a number of arrangements of cells in the two-dimensional code, and setting the inspection lines which connect corresponding ones of the division points.

A third aspect of this invention provides a method of reading a two-dimensional code. The method comprises the steps of taking an image of a region including the two-dimensional code; determining a two-dimensional code area in the image, the two-dimensional code area corresponding to the two-dimensional code; setting inspection lines connecting opposite sides in two pairs among four sides indicating boundaries of the two-dimensional code area in cases where the two-dimensional code is of a cell matrix type, and setting inspection lines connecting opposite sides in one pair among four sides indicating boundaries of the two-dimensional code area in cases where the two-dimensional code is of a bar-code stack type; and reading information from the two-dimensional code area on the basis of the inspection lines. The inspection-line setting step comprises setting division points on the opposite sides in response to a ratio in length between a reference adjacent side connecting first ends of the opposite sides and a line segment parallel with the reference adjacent side and extending from a second end of first one of the opposite sides to second one of the opposite sides, and in response to a number of arrangements of cells in the two-dimensional code in cases where the two-dimensional code is of the cell matrix type, setting division points on the opposite sides in response to a ratio in length between a reference adjacent side connecting first ends of the opposite sides and a line segment parallel with the reference adjacent side and extending from a second end of first one of the opposite sides to second one of the opposite sides, and in response to a number of stacked bar codes in the two-dimensional code in cases where the two-dimensional code is of the bar-code stack type, and setting the inspection lines which connect corresponding ones of the division points.

A fourth aspect of this invention provides a two-dimensional code reading apparatus comprising image taking means for taking an image of a region including a two-dimensional code of a cell matrix type; area determining means for determining a two-dimensional code area in the image taken by the image taking means, the two-dimensional code area corresponding to the two-dimensional code; inspection line setting means for setting inspection lines connecting opposite sides in two pairs among four sides indicating boundaries of the two-dimensional code area determined by the area determining means; and cell reading means for determining intersections of the inspection lines set by the inspection line setting means to be cell positions, and detecting types of cells in the two-dimensional code in response to the determined cell positions. The inspection line setting means comprises means for setting division points on the opposite sides in response to a ratio in length between sides adjacent to the opposite sides and a number of arrangements of cells in the two-dimensional code, and means for setting the inspection lines which connect corresponding ones of the division points.

A fifth aspect of this invention provides a two-dimensional code reading apparatus comprising image taking means for taking an image of a region including a two-dimensional code of a bar-code stack type; area determining means for determining a two-dimensional code area in the image taken by the image taking means, the two-dimensional code area corresponding to the two-dimensional code; inspection line setting means for setting inspection lines connecting opposite sides in one pair among four sides indicating boundaries of the two-dimensional code area determined by the area determining means; and bar-code reading means for scanning the two-dimensional code area along the inspection lines set by the inspection line setting means, and reading bar-code information from the two-dimensional code area. The inspection line setting means comprises means for setting division points on the opposite sides in response to a ratio in length between sides adjacent to the opposite sides and a number of stacked bar codes in the two-dimensional code, and means for setting the inspection lines which connect corresponding ones of the division points.

A sixth aspect of this invention is based on the fourth aspect thereof, and provides a two-dimensional code reading apparatus wherein the inspection line setting means comprises means for detecting a specified pattern in the two-dimensional code area, means for calculating positions of centers of given cells in the two-dimensional code on the basis of the specified pattern, means for setting the calculated center positions as division points on first one of the opposite sides, means for setting division points on second one of the opposite sides in response to a ratio in length between sides adjacent to the opposite sides and a number of arrangements of cells in the two-dimensional code, and means for setting the inspection lines which connect corresponding ones of the division points.

A seventh aspect of this invention is based on the sixth aspect thereof, and provides a two-dimensional code reading apparatus wherein the inspection line setting means comprises means for scanning a group of pixels corresponding to a dark portion in a timing cell array in the two-dimensional code area along a main scanning direction and a sub scanning direction, means for selecting two outermost pixels from the scanned pixel group in the main scanning direction, means for selecting two outermost pixels from the scanned pixel group in the sub scanning direction, means for calculating a position intermediate among the selected outermost pixels in the main scanning direction and the sub scanning direction, and means for using the calculated intermediate position as one of the calculated center positions.

An eighth aspect of this invention is based on the sixth aspect thereof, and provides a two-dimensional code reading apparatus wherein the inspection line setting means comprises means for calculating coordinates of centers of dark portions in a timing cell array in the two-dimensional code area, means for calculating coordinates of centers of bright portions in the timing cell array in the two-dimensional code area from the calculated coordinates of the centers of the dark portions, and means for using the calculated coordinates of the centers of the dark portions and the bright portions as the calculated center positions.

A ninth aspect of this invention provides a two-dimensional code reading apparatus comprising image taking means for taking an image of a region including a two-dimensional code of a cell matrix type; area determining means for determining a two-dimensional code area in the image taken by the image taking means, the two-dimensional code area corresponding to the two-dimensional code; inspection line setting means for setting inspection lines connecting opposite sides in two pairs among four sides indicating boundaries of the two-dimensional code area determined by the area determining means; and cell reading means for determining intersections of the inspection lines set by the inspection line setting means to be cell positions, and detecting types of cells in the two-dimensional code in response to the determined cell positions. The inspection line setting means comprises means for setting division points on the opposite sides in response to a ratio in length between a reference adjacent side connecting first ends of the opposite sides and a line segment parallel with the reference adjacent side and extending from a second end of first one of the opposite sides to second one of the opposite sides, and in response to a number of arrangements of cells in the two-dimensional code, and means for setting the inspection lines which connect corresponding ones of the division points.

A tenth aspect of this invention provides a recording medium storing a computer program for implementing a method of reading a two-dimensional code. The method comprises the steps of taking an image of a region including the two-dimensional code; determining a two-dimensional code area in the image, the two-dimensional code area corresponding to the two-dimensional code; setting inspection lines connecting opposite sides in two pairs among four sides indicating boundaries of the two-dimensional code area in cases where the two-dimensional code is of a cell matrix type, and setting inspection lines connecting opposite sides in one pair among four sides indicating boundaries of the two-dimensional code area in cases where the two-dimensional code is of a bar-code stack type; and reading information from the two-dimensional code area on the basis of the inspection lines. The inspection-line setting step comprises setting division points on the opposite sides in response to a ratio in length between sides adjacent to the opposite sides and a number of arrangements of cells in the two-dimensional code in cases where the two-dimensional code is of the cell matrix type, setting division points on the opposite sides in response to a ratio in length between sides adjacent to the opposite sides and a number of stacked bar codes in the two-dimensional code in cases where the two-dimensional code is of the bar-code stack type, and setting the inspection lines which connect corresponding ones of the division points.

DESCRIPTION OF THE PREFERRED EMBODIMENTS

Prior-art systems will be explained below for a better understanding of this invention.

Figure 1:
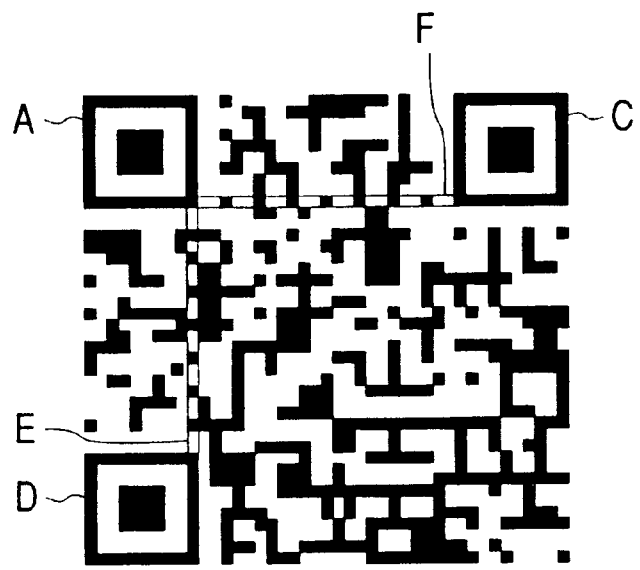
FIG. 1 is a plan view of an example of a QR code.

FIG. 1 shows an example of a state of a prior-art QR (quick response) code which is one type of a two-dimensional code. In a prior-art method of reading a QR code, a first step detects positioning symbols "A", "C", and "D" from the features of the pattern formed by the QR code. Then, a second step detects linear timing cell arrays "E" and "F" extending among the positioning symbols "A", "C", and "D". Each of the linear timing cell arrays "E" and "F" has a line of the alternation of white cells and black cells. Subsequently, an image processing step detects the positions of the centers of the positioning symbols "A", "C", and "D", and the positions of the centers of the cells composing the linear timing cell arrays "E" and "F". Thereafter, the detected positions of the centers are used in calculating the positions of the centers of other cells constituting data cells.

The positioning symbols "A", "C", and "D" and the linear timing cell arrays "E" and "F" indicate the positions of columns and rows along which the cells composing the QR code are arranged at equal intervals in a matrix configuration. In the case where X-direction and Y-direction inspection lines which pass through the centers of the positioning symbols "A", "C", and "D", and the centers of the cells composing the linear timing cell arrays "E" and "F" are set in an area of the QR code, the intersections of the inspection lines coincide with the centers of data cells respectively. Thus, the positions of the centers of data cells are calculated by computing the positions of the intersections of the inspection lines.

Then, reading each data cell is implemented in response to the calculated position of the center thereof, and a determination is made as to whether each data cell is white or black (that is, blight or dark). In this way, the QR code is decoded.

Figure 2:
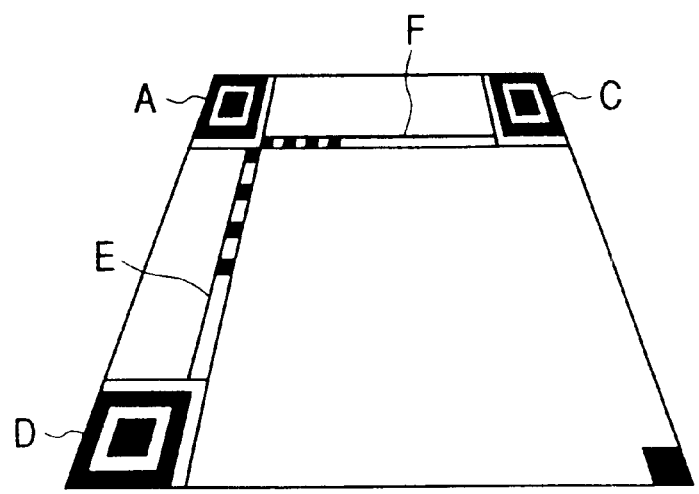
FIG. 2 is a diagram of a distorted image of the QR code in FIG. 1.

FIG. 2 shows an image of the QR code represented by an output signal of an image sensor which occurs in the case where the image sensor is slant or oblique with respect to a plane of the QR code. In this case, the calculated positions of data cells near the positioning symbols "A", "C", and "D" and the linear timing cell arrays "E" and "F" have only small errors with respect to the actual positions thereof. Accordingly, the state or type ("white" or "black") of each of these data cells can be accurately determined. On the other hand, the calculated positions of data cells remoter from the positioning symbols "A", "C", and "D" and the linear timing cell arrays "E" and "F" have greater errors. Accordingly, the state or type ("white" or "black") of each of these data cells can not be accurately determined.

Figure 3:
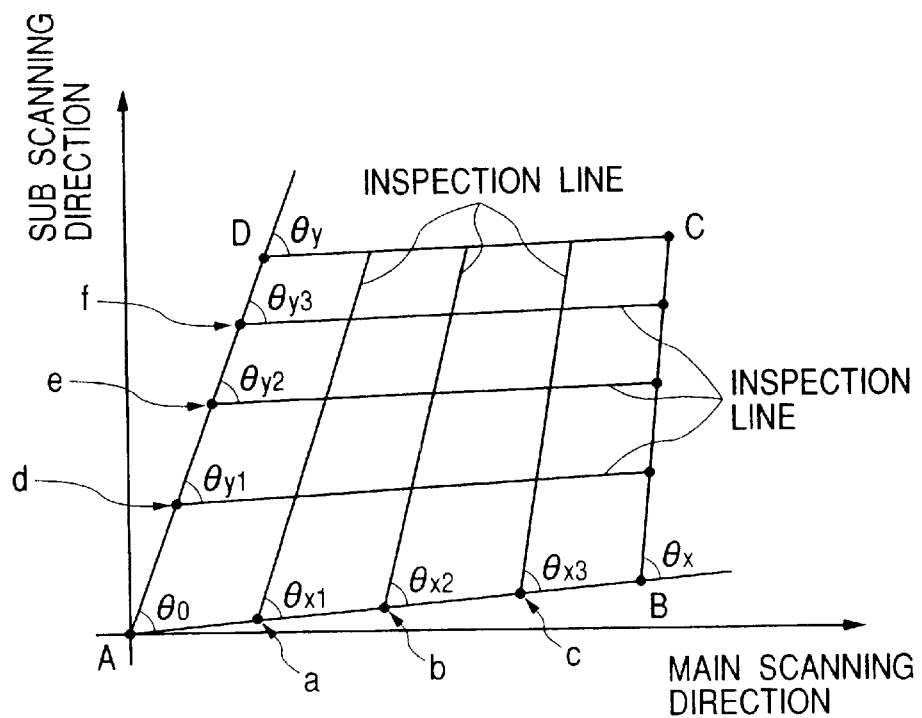
FIG. 3 is an illustration of an example of a two-dimensional code area and inspection lines set in a prior-art system.

A prior-art digital data reader disclosed in Japanese Patent No. 2742555 (corresponding to U.S. Pat. No. 5,408,543 and U.S. Pat. No. 5,410,620) will be explained below. It is assumed that a two-dimensional code of a square shape is read as an image equal to a distorted quadrilateral ABCD shown in FIG. 3. The distorted image of the two-dimensional code, that is, the distorted quadrilateral ABCD, is scanned along a main scanning direction and a sub scanning direction (directions along which pixels are arranged). An area (a two-dimensional code area) defined by the boundaries of the two-dimensional code is determined on the basis of the features of the pattern provided as a result of the scanning. For example, the coordinates of the apexes "A", "B", "C", and "D" of the two-dimensional code area are determined. The positions of columns and rows of cells are calculated on the basis of linear timing cell arrays. In FIG. 3, the linear timing cell arrays are located on the sides AB and AD respectively. The points "a", "b", and "c" on the side AB denote the calculated column positions respectively. The points "d", "e", and "f" on the side AD denote the calculated row positions respectively.

Inspection lines passing through the points "a", "b", and "c" on the side AB are set as follows. The angle $\theta_O$ between the sides AB and AD is calculated. In addition, the angle $\theta_x$ between the sides AB and BC is calculated. Then, the angle $\theta_{x1}$ is calculated by proportional division between the angle $\theta_O$ and the angle $\theta_x$ on the basis of the position of the point "a" on the side AB. The line passing through the point "a" and forming the angle $\theta_{x1}$ with respect to the side AB is set as an inspection line. Similarly, the angles $\theta_{x2}$ and $\theta_{x3}$ are calculated by proportional division between the angle $\theta_0$ and the angle $\theta_x$ on the basis of the positions of the points "b" and "c" on the side AB. The line passing through the point "b" and forming the angle $\theta_{x2}$ with respect to the side AB is set as an inspection line. In addition, the line passing through the point "c" and forming the angle $\theta_{x3}$ with respect to the side AB is set as an inspection line.

Inspection lines passing through the points "d", "e", and "f" on the side AD are set as follows. The angle $\theta_O$ between the sides AB and AD is calculated. In addition, the angle $\theta_y$ between the sides AD and DC is calculated. Then, the angle $\theta_{y1}$ is calculated by proportional division between the angle $\theta_O$ and the angle $\theta_y$ on the basis of the position of the point "d" on the side AD. The line passing through the point "d" and forming the angle $\theta_{y1}$ with respect to the side AD is set as an inspection line. Similarly, the angles $\theta_{y2}$ and $\theta_{y3}$ are calculated by proportional division between the angle $\theta_O$ and the angle $\theta_y$ on the basis of the positions of the points "e" and "f" on the side AD. The line passing through the point "e" and forming the angle $\theta_{y2}$ with respect to the side AD is set as an inspection line. In addition, the line passing through the point "f" and forming the angle $\theta_{y3}$ with respect to the side AD is set as an inspection line.

The intersections of the inspection lines (or the intersections of the inspection lines and the four sides of the distorted quadrilateral) are used as the positions of data cells. Then, a determination is made as to whether each data cell is white or black (that is, bright or dark). In this way, the two-dimensional code is decoded from the distorted image thereof.

Even in the case where a two-dimensional code of a square shape is read as a distorted quadrilateral, the prior-art digital data reader in Japanese Patent No. 2742555 can correctly decode the two-dimensional code since the positions of data cells are accurately calculated.

The description in Japanese Patent No. 2742555 places the focus on how to accurately calculate the centers of data cells but does not refer to a time necessary for decoding a two-dimensional code. The prior-art digital data reader in Japanese Patent No. 2742555 spends a relatively long decoding time for the reason that calculation is made as to the angles with the sides AB and AD which may angularly deviate from the main scanning direction and the sub scanning direction (the reference coordinate system).

Figure 4:
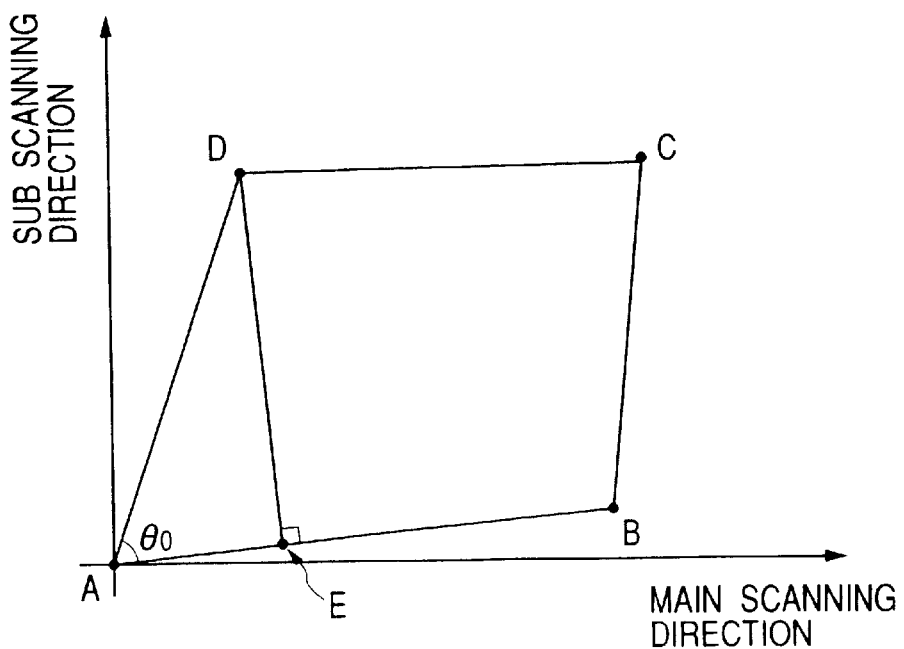
FIG. 4 is an illustration of the two-dimensional code area in FIG. 3 to which a line segment extending from one apex and being perpendicular to one side is added.

For example, the angle $\theta_O$ between the sides AB and AD is calculated as follows. With reference to FIG. 4, the perpendicular to the side AB is drawn from the apex "D". The intersection of the perpendicular and the side AB is denoted by the letter "E". The angle $\theta_O$ is computed according to the following equation.

$$\theta_O = \tan^{-1}(ED/AE)$$

In general, calculation of such a trigonometric function takes a significantly longer time than simple calculation or simple division. Since the inspection lines are set on the basis of the angles calculated by proportional division as previously mentioned, the setting of the inspection lines contains the calculation of the angles. As the number of inspection lines increases, the number of angles to be calculated also increases. The increased number of angles causes a longer calculation time. Therefor, the prior-art digital data reader in Japanese Patent No. 2742555 spends a relatively long time in decoding a two-dimensional code.

Figure 5:
FIG. 5 is a plan view of an example of a two-dimensional code of a bar-code stack type.

FIG. 5 shows an example of a state of a prior-art two-dimensional code of a bar-code stack type which is referred to as a code "49". The prior-art two-dimensional code in FIG. 5 has a stack of one-dimensional bar codes. After the prior-art two-dimensional code is read as an image, inspection lines "a", "b", "c", "d", and "e" are set along the bar codes respectively as shown in FIG. 5. The image is scanned along the inspection lines "a"–"e", and the bar codes are decoded.

In the case of a distorted image of the prior-art two-dimensional code of the bar-code stack type, directions along the bar codes deviate from normal directions. Thus, inspection lines also deviate from the bar codes. When the deviation of the inspection lines from the bar codes is great, it is difficult to accurately decode the prior-art two-dimensional code of the bar-code stack type.

First Basic Embodiment

A first basic embodiment of this invention is directed to a method of reading a two-dimensional code of either a cell matrix type or a bar-code stack type. The two-dimensional code of the cell matrix type is composed of cells representing unit pieces of binary coded data respectively. The cells are arranged in columns and rows forming a matrix configuration. The two-dimensional code of the bar-code stack type has a stack of bar codes representing portions of data respectively. The stack extends in a direction perpendicular to the longitudinal directions of the bar codes. Examples of the two-dimensional code of the cell matrix type are a QR code, a data code, a veri code, and a CP code. Examples of the two-dimensional code of the bar-code stack type are a code "49" and a code "16$k$".

The method according to the first basic embodiment of this invention implements an area determining process. In the area determining process, an image of a two-dimensional code to be decoded is taken. Furthermore, the image is scanned, and a two-dimensional code area is determined in the image. The original two-dimensional code has a rectangular shape (including a square shape). Therefore, a two-dimensional code area in the image has a quadrilateral shape even in the case where an image sensor is slant with respect to a plane of the original two-dimensional code and hence the image is distorted from the original. Thus, a two-dimensional code area having a quadrilateral shape is determined in the image. For example, the two-dimensional code area in the image is defined by four apexes.

After the area determining process, an inspection-line setting process is implemented. The inspection-line setting process is a process of setting inspection lines connecting opposite sides among the four sides which indicate the boundaries of the two-dimensional code area. As previously mentioned, the two-dimensional code area has a quadrilateral shape. Thus, the two-dimensional code area is represented by two pairs (two sets) of opposite sides.

In a two-dimensional code of the cell matrix type, cells are arranged along two directions, and inspection lines extending along these two directions are set. The inspection lines connect the opposite sides in the two pairs. In a two-dimensional code of the bar-code stack type, a stack extends in a direction perpendicular to the longitudinal directions of bar codes, and inspection lines extending along the longitudinal directions of the bar codes are set. The inspection lines connect opposite sides in one of the two pairs.

Subsequently, a decoding process is implemented. The decoding process is a process of reading information from the two-dimensional code on the basis of the inspection lines set by the preceding process. In the case of a two-dimensional code of the cell matrix type, the intersections of the inspection lines (or the intersections of the inspection lines and the sides) are used as cell positions respectively. The type or state of a cell at each of the cell positions is detected. As a result, the two-dimensional code is read and decoded. In the case of a two-dimensional code of the bar-code stack type, the image is scanned along the inspection lines, and information pieces are read from the bar codes respectively. As a result, the two-dimensional code is read and decoded.

The method according to the first basic embodiment of this invention has an inventive feature in the inspection-line setting process. The inventive feature is as follows. In the inspection-line setting process, division points are set on the opposite sides of the two-dimensional code area, and inspection lines are set which connect corresponding ones of the division points on the opposite sides. Thus, the inventive feature is that each inspection line is set by calculating two points which the inspection line should meet. The time necessary for the setting of the inspection lines can be remarkably shorter than that in a prior-art method having an angle calculation step for each inspection line.

In the method according to the first basic embodiment of this invention, the setting of the division points on the sides is executed in a division-point setting process. For each side being an object, the division-point setting process sets division points in response to the ratio in length between two sides adjacent to the object side, and also the number of the columns or rows of cells or the number of the stacked bar codes. The division points set on the object side approximate to the cell column or row positions, or the bar-code positions in the direction along the object side. In the case where the two-dimensional code area in the image is distorted from the original, the intervals between the cell column or row positions on each side, or the intervals between the bar-code positions on each side are not equal. Cell column or row positions, or cell bar-code positions spaced along each side at intervals which are unequal due to a one-dimensional distortion of the side are calculated as division points. The cell arrangement number is defined as the number of columns or rows of cells in connection with an object side, that is, the number of cells in the direction along the object side. The bar-code stack number is defined as the number of the bar codes stacked to compose the two-dimensional code of the bar-code stack type. Preferably, the cell arrangement number or the bar-code stack number is provided by scanning the image. For example, the cell arrangement number or the bar-code stack number is derived from a timing cell array or a positioning cell having a specified pattern. Alternatively, a predetermined number may be used as the cell arrangement number or the bar-code stack number.

Figure 6:
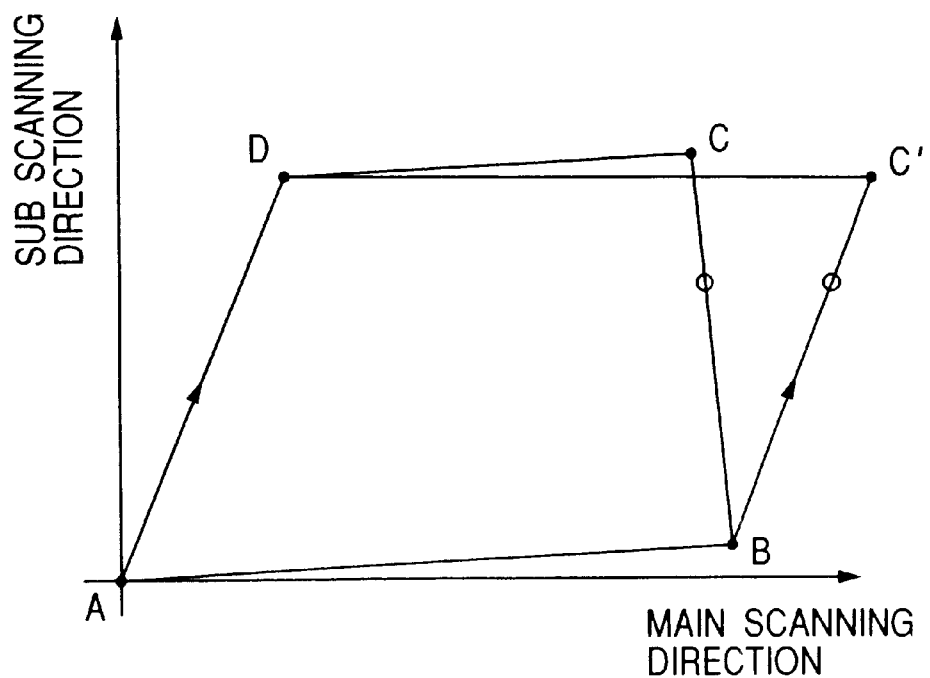
FIG. 6 is an illustration of a two-dimensional code area and a related trapezoid.

An explanation will be given of the setting of division points on an object side of a two-dimensional code area in response to the ratio in length between two sides adjacent to the object side. With reference to FIG. 6, division points are set on a side AB of a two-dimensional code area ABCD as follows. One of the apexes "C" and "D" separate from the side AB is moved while the lengths of the sides AD and BC remain unchanged, so that the two-dimensional code area ABCD is changed to a trapezoid having parallel sides AD (or AD') and BC' (or BC) adjacent to the side AB. In FIG. 6, the two-dimensional code area ABCD is changed to a trapezoid ABC'D.

Figure 7:
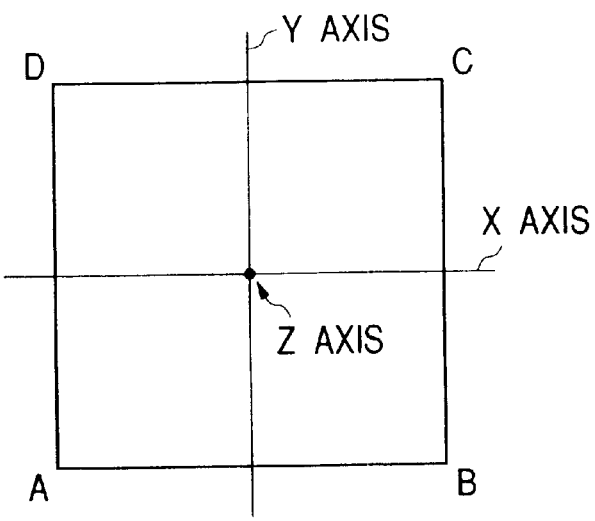
FIG. 7 is an illustration of a square shape of a two-dimensional code.

Provided that the sides AD and BC adjacent to the side AB are parallel to each other, division points can be set on the side AB. An original two-dimensional code is considered which has a square shape ABCD shown in FIG. 7. An X axis, a Y axis, and a Z axis which are perpendicular to each other are shown in FIG. 7. It is assumed that the two-dimensional code ABCD extends on the XY plane, and the side AB is parallel with the X axis. The two-dimensional code ABCD is composed of cells arranged along the X-axis direction and the Y-axis direction. The positions of cells (the positions of cell arrangements) in the X-axis direction are spaced at equal intervals. Similarly, the positions of cells (the positions of cell arrangements) in the Y-axis direction are spaced at equal intervals.

Figure 8:
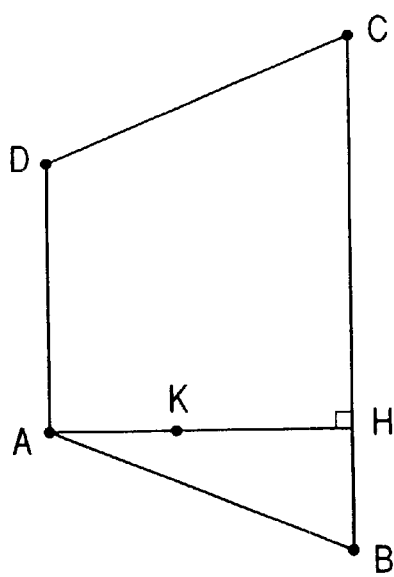
FIG. 8 is an illustration of a trapezoidal two-dimensional code area.

In the case where the two-dimensional code ABCD is rotated from its normal position about the Y axis and an image thereof is taken along the Z-axis direction, the two-dimensional code ABCD is read as an image which has a trapezoidal two-dimensional code area ABCD such as shown in FIG. 8. On the premise that the deformation is proportional in the X-axis direction and the Y-axis direction regarding the trapezoidal two-dimensional code area ABCD, the inter-cell interval in a region decreases as the region is closer to the side AD since the the length of the side AD is smaller than the length of the side BC in FIG. 8. The cell arrangement positions in the X-axis direction can be calculated on the basis of the ratio in length between the side (the upper base) AD and the side (the lower base) BC in a mathematical way. Thus, provided that the two-dimensional code area ABCD has a trapezoidal shape, division points on the side AB can be set on the basis of a length ratio similar to that in the X-axis direction, that is, on the basis of the lengths of the sides AD and BC.

When the two-dimensional code area ABCD is considered to be a trapezoidal two-dimensional code area ABC'D as shown in FIG. 6, division points approximating to cell arrangement positions can be set on the side AB in response to the lengths of the sides AD and BC (BC'). Similarly, division points can be set on the side DC in response to the lengths of the sides AD and BC. The division points on the side AB and the division points on the side DC depend on the ratio in length between the sides AD and BC adjacent to the sides AB and DC but are unrelated to the trapezoid formed by the two-dimensional code area ABC'D. Thus, the division points on the side AB and the division points on the side DC are set on the basis of the same length ratio.

Considering the two-dimensional code area ABCD to be a trapezoid is proper for the following reason. Using the trapezoid ABC'D as an approximation to the two-dimensional code area ABCD (see FIG. 6) means that in calculation of the distortion of the side AB, a change in length of the side DC opposite to the side AB does not affect the distortion of the side AB. Thus, in calculation of the distortion of the side AB, the length of the side DC opposite to the side AB may be changed provided that the lengths of the sides AD and BC adjacent thereto remain unchanged.

Figure 9:
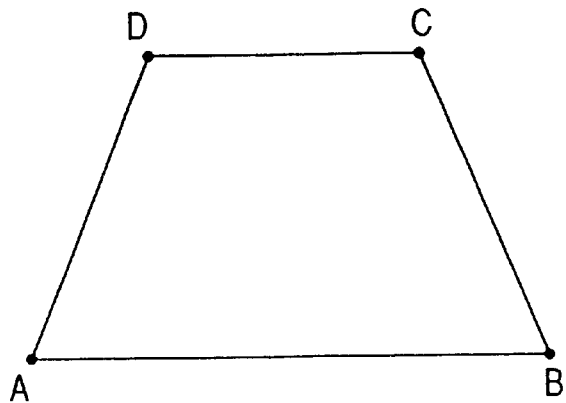
FIG. 9 is an illustration of a distorted two-dimensional code area.

Obliquely reading the two-dimensional code ABCD means taking an image thereof under the conditions where the two-dimensional code ABCD is rotated from its normal position about the X axis, the Y axis, or the Z axis (see FIG. 7). Rotation of the two-dimensional code ABCD about the Z axis does not cause any distortion in its image. As shown in FIGS. 7 and 9, rotation of the two-dimensional code ABCD about the X axis causes a distortion of its image in the Y-axis direction, that is, a distortion on the sides AD and BC. Thus, the intervals between the cell arrangement positions on the sides AD and BC are unequal. As shown in FIGS. 7 and 8, rotation of the two-dimensional code ABCD about the Y axis causes a distortion of its image in the X-axis direction, that is, a distortion on the sides AB and DC. Thus, the intervals between the cell arrangement positions on the sides AB and DC are unequal. As understood from the previous explanation, a change in length of the side DC relative to the side AB is caused by rotation of the two-dimensional code ABCD about the X axis. At this time, conditions of the distortion of the side AB remain unchanged. Accordingly, a distortion of the side AB is caused when the ratio in length between the sides AD and BC changes. On the other hand, the distortion of the side AB remains unchanged even when the length of the side DC changes. Therefore, the length of a side opposite to an object side may be changed provided that the lengths of two sides adjacent to the object side remain unchanged (specifically, the ratio in length between two sides adjacent to the object side remains unchanged). A trapezoid which results from changing a side opposite to an object side can be used as an approximation to a two-dimensional code area (see FIG. 6).

As previously mentioned, a trapezoid having given conditions can be approximate to a two-dimensional code area, and division points on an object side can be set on the basis of the ratio in length between two sides adjacent to the object side. For each of opposite sides, division points which approximate to cell arrangement positions on the side are actually set in such a way. Inspection lines are set which connect corresponding ones of the division points. In this case, errors of the positions of cells or errors of the positions of bar codes can be calculated. In the case of a two-dimensional code of the bar-code stack type, scanning an image thereof along the inspection lines causes suitably scanning the image along the bar-code arrangements. In the case of a two-dimensional code of the cell matrix type, inspection lines are set which connect opposite sides in two pairs, and two-dimensional errors of the positions of cells can be calculated.

As previously mentioned, inspection lines are set by a simple calculation step corresponding to an operation of connecting division points. Therefore, the time taken to set the inspection lines is remarkably shorter than that in a prior-art method having an angle calculation step for each inspection line. Thus, even in the case where an image of a two-dimensional code is distorted, the two-dimensional code can be accurately decoded in a short time.

Second Basic Embodiment

A second basic embodiment of this invention is directed to a method of reading a two-dimensional code of a cell matrix type which contains a specified pattern such as a linear timing cell array or a positioning symbol. The linear timing cell array has a line of the alternation of white cells and black cells (that is, bright cells and dark cells). The linear timing cell array indicates cell arrangement positions. In the case where the two-dimensional code is a QR code, the positioning symbol has such a pattern that frequency components corresponding to two scanning directions are equal. In the QR code, one positioning symbol corresponds to seven cells, and hence indicates cell arrangement positions.

The method in the second basic embodiment of this invention uses the specified pattern in reading and decoding the two-dimensional code of the cell matrix type. The two-dimensional code of the cell matrix type is composed of cells representing unit pieces of binary coded data respectively. The cells are arranged in columns and rows forming a matrix configuration. Examples of the two-dimensional code of the cell matrix type are a QR code and a data code.

Similar to the method in the first basic embodiment of this invention, the method according to the second basic embodiment of this invention implements the following processes. An image of a two-dimensional code is taken. An area determining process is implemented which determines a two-dimensional code area in the taken image. An inspection-line setting process is executed which sets inspection lines connecting opposite sides in two pairs among the four sides which indicate the boundaries of the two-dimensional code area. A decoding process is implemented which reads and recovers information from the two-dimensional code on the basis of the inspection lines.

In the case where a specified pattern indicating cell arrangement positions is on or near first one of opposite sides, the positions of the centers of given cells are calculated on the basis of the specified pattern. Then, the calculated center positions are set as division points on the first one of the opposite sides. Regarding second one of the opposite sides, a division-point setting process is executed. The division-point setting process sets division points on an object side in response to the cell arrangement number and also the ratio in length between sides adjacent to the object side. Subsequently, inspection lines are set which connect corresponding ones of the division points on the opposite sides.

The specified pattern indicative of the cell arrangement positions means, for example, a linear timing cell array. In a data code, one of opposite sides is formed by a linear timing cell array having a specified pattern indicating cell arrangement positions. In a veri code or a CP code, a linear timing cell array having a specified pattern indicative of cell arrangement positions is located immediately inward of one of opposite sides. In a QR code, a positioning symbol and a linear timing cell array having specified patterns indicative of cell arrangement positions are located on or near one of opposite sides.

As previously mentioned, the positions of the centers of given cells are calculated on the basis of the specified pattern. For example, in the case where the specified pattern is indicated by a linear timing cell array, the positions of the centers of white and black cells (bright and dark cells) composing the array are computed. Then, the calculated center positions are set as division points on the first one of the opposite sides. As previously mentioned, division points are set on the second one of the opposite sides by the division-point setting process.

The division points which coincide with the positions of the centers of the given cells are determined by the process including a step of scanning the image of the two-dimensional code. Accordingly, errors of these division points from correct positions on the actual two-dimensional code are smaller than those of division points determined by a full calculation process.

As previously mentioned, inspection lines are set which connect corresponding ones of the division points on the opposite sides. Subsequently, cell positions are determined on the basis of the inspection lines. Since the division points have smaller errors, the determined cell positions are more accurate. Thus, it is possible to more correctly read and decode the two-dimensional code. Since the setting of the inspection lines is implemented by the process exclusive of angle calculation, the decoding time can be shorter than that in a prior-art method having an angle calculation step for each inspection line.

Third Basic Embodiment

Major factors affecting a distortion of a side AB of a two-dimensional code area ABCD are thought to be ① the ratio in length between two sides AD and BC adjacent to the side AB, and ② the slope of a side DC opposite to the side AB. A third basic embodiment of this invention is directed to a method of reading a two-dimensional code in which a trapezoid is used on the premise that a variation in the ratio ① is small.

Figure 10:
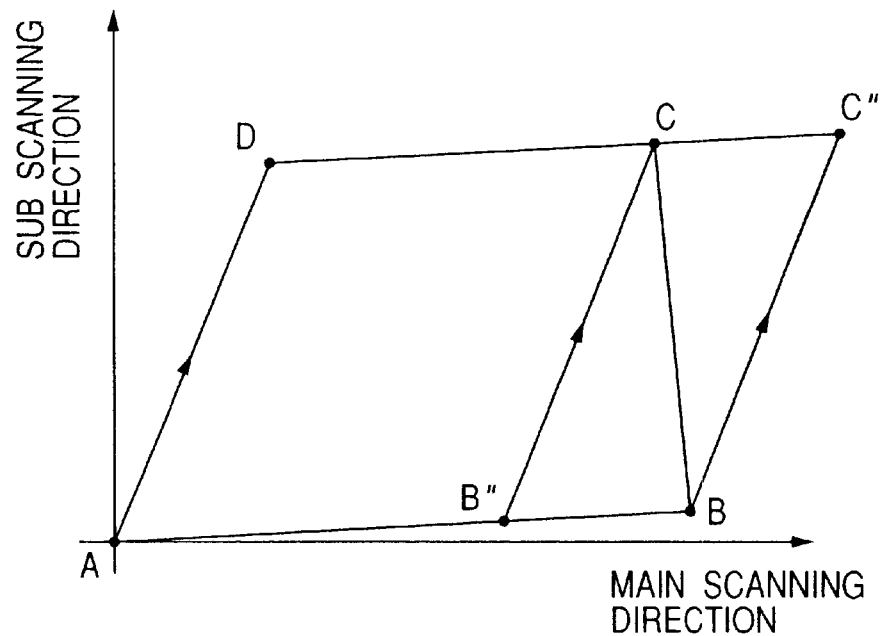
FIG. 10 is an illustration of a two-dimensional code area and a related trapezoid.

As shown in FIG. 10, a trapezoid ABC"D is used for a two-dimensional code area ABCD. A line parallel with the side AD is drawn from the end B of the side AB, and the intersection of this line and an extension of the side DC is denoted by the character C". Regarding the trapezoid ABC"D, division points on the side AB are set in response to the ratio in length between the sides AD and BC".

The method in the third basic embodiment of this invention includes a division-point setting process designed as follows. In the division-point setting process, a segment (a line segment) is drawn from one end of an object side to a side opposite to the object side along a direction parallel to a side (a reference adjacent side) extending from the other end of the object side. Then, division points are set on the object side in response to the ratio in length between the segment and the reference adjacent side. Here, the side opposite to the object side means not only an original side but also an extension of the original side.

Since the lengths of the sides BC and BC" are different as shown in FIG. 10, the ratio in length between the sides AD and BC" of the trapezoid ABC"D differs the ratio in length between the sides AD and BC of the two-dimensional code area ABCD. The characteristics of an optical system in an image sensor and other factors prevent an excessively distorted image of a two-dimensional code from being taken. Thus, in fact, the lengths of the sides BC and BC" are hardly different.

The method in the third basic embodiment of this invention provides advantages similar to those provided by the methods of the first and second basic embodiments of this invention. As previously mentioned, the division-point setting process sets division points on opposite sides. Then, inspection lines are set which connect corresponding ones of the division points on the opposite sides. Errors of cell arrangement positions or bar-code arrangement positions in the two-dimensional code area can be calculated on the basis of the inspection lines. In the case of a two-dimensional code of the bar-code stack type, scanning an image thereof along the inspection lines causes suitably scanning the image along the bar-code arrangements. In the case of a two-dimensional code of the cell matrix type, inspection lines are set which connect opposite sides in two pairs, and two-dimensional errors of the positions of cells can be calculated.

As previously mentioned, inspection lines are set by a simple calculation step corresponding to an operation of connecting division points. Therefore, the time taken to set the inspection lines is remarkably shorter than that in a prior-art method having an angle calculation step for each inspection line. Thus, even in the case where an image of a two-dimensional code is distorted, the two-dimensional code can be accurately decoded in a short time.

Fourth Basic Embodiment

A fourth basic embodiment of this invention is directed to an apparatus corresponding to the method in the first basic embodiment thereof. The apparatus in the fourth basic embodiment of this invention operates for reading a two-dimensional code of a cell matrix type. The two-dimensional code of the cell matrix type is composed of cells representing unit pieces of binary coded data respectively. The cells are arranged in columns and rows forming a matrix configuration.

The apparatus in the fourth basic embodiment of this invention includes an image taking device (an image sensor). The image taking device takes an image of a given region including a two-dimensional code. The image taking device has a light emitter for applying reading light to the given region (including the two-dimensional code), and a CCD image sensor for receiving light caused by reflection of the reading light at the given region and converting the received light into an electric signal representative of an image of the given region (including the two-dimensional code). The image taking device outputs the image-representing electric signal.

In the apparatus according to the fourth basic embodiment of this invention, an area determining device scans the image of the given region (including the two-dimensional code), and determines an area (a two-dimensional code area) in the image which is defined by the boundaries of the two-dimensional code. Specifically, the area determining device scans the image of the given region which is represented by the output signal of the image taking device. The area determining device detects a specified pattern in the image which is contained in the two-dimensional code. Then, the area determining device determines a two-dimensional code area in response to the detected specified pattern.

The specified pattern is represented by, for example, a positioning symbol, a linear timing cell array, or a peripheral cell array which indicates a two-dimensional code area or cell arrangement positions. In the case where the two-dimensional code is a QR code, a positioning symbol has such a pattern that frequency components corresponding to two scanning directions are equal. In the case where the two-dimensional code is a veri code or a CP code, a peripheral cell array indicative of the outer edge of the two-dimensional code is composed of black cells (dark cells) only. As previously mentioned, the area determining device detects the specified pattern, and determines a two-dimensional code area in response to the detected specified pattern. The two-dimensional code area may be determined by another process including a step of scanning the image. Since the original two-dimensional code has a rectangular shape or a square shape, the two-dimensional code area in the image is defined by, for example, the coordinates (the positions) of the four apexes thereof.

Subsequently, an inspection-line setting device sets inspection lines connecting opposite sides in two pairs among the four sides which indicate the boundaries of the two-dimensional code area. A cell reading device calculates the locations of the intersections of the inspection lines set by the inspection-line setting device. The cell reading device uses the locations of the intersections of the inspection lines as cell positions respectively, and reads and detects a type (a state) of each cell. The intersections of the inspection lines may be the intersections of the inspection lines and the sides of the two-dimensional code area.

The apparatus according to the fourth basic embodiment of this invention has an inventive feature in the inspection-line setting device. The inventive feature is as follows. The inspection-line setting device implements a division-point setting process by which division points are set on each of opposite sides of the two-dimensional code area. Inspection lines are set which connect corresponding ones of the division points on the opposite sides. Thus, the inventive feature is that each inspection line is set by calculating two points which the inspection line should meet. The time necessary for the setting of the inspection lines can be remarkably shorter than that in a prior-art method having an angle calculation step for each inspection line.

The division-point setting process implemented by the inspection-line setting device is similar to that in the first basic embodiment or the second basic embodiment of this invention. Thus, the division points set on a side approximate to the cell arrangement positions in the direction of the side. A one-dimensional distortion of the side is calculated as the positions of the division points thereon. As previously mentioned, inspection lines are set which connect corresponding ones of the division points. In this case, errors of the cell arrangement positions in the two-dimensional code area can be calculated. When inspection lines are set which connect opposite sides in two pairs, two-dimensional errors of the positions of cells can be calculated. Therefore, it is possible to quickly determine the cell positions for the detection of the types of the cells. Also, the two-dimensional code can be accurately decoded in a short time.

Fifth Basic Embodiment

A fifth basic embodiment of this invention is directed to an apparatus corresponding to the method in the first basic embodiment thereof. The apparatus in the fifth basic embodiment of this invention operates for reading a two-dimensional code of a bar-code stack type. The two-dimensional code of the bar-code stack type has a stack of bar codes representing portions of data respectively. The stack extends in a direction perpendicular to the longitudinal directions of the bar codes.

In the apparatus according to the fifth basic embodiment of this invention, an image taking device (an image sensor) takes an image of a given region including a two-dimensional code. In addition, an area determining device scans the image of the given region (including the two-dimensional code), and determines a two-dimensional code area in the image.

Then, an inspection-line setting device sets inspection lines connecting opposite sides in one pair among the four sides which indicate the boundaries of the two-dimensional code area. The opposite sides are substantially perpendicular to the longitudinal directions of the bar codes. The inspection lines extend along the longitudinal directions of the bar codes. A bar-code reading device scans the two-dimensional code area along the inspection lines, and recovers data portions from the bar codes respectively.

The inspection-line setting device implements a division-point setting process by which division points are set on each of the opposite sides of the two-dimensional code area. Inspection lines are set which connect corresponding ones of the division points on the opposite sides. The division-point setting process is basically similar to that in the first basic embodiment of this invention except for the following point. The setting of the division points depends on the bar-code stack number.

Specifically, the division points are used as approximations to the bar-code positions on the opposite sides. Inspection lines are set which connect corresponding ones of the division points on the opposite sides. Thus, the inspection lines are designed to cancel errors of the bar-code positions due to an image distortion in a direction perpendicular to the longitudinal directions of the bar codes. Accordingly, even in the case where an image of a two-dimensional code is distorted, bar-code positions suitable for reading data portions from bar codes can be quickly determined.

Therefore, the two-dimensional code can be accurately read and decoded in a short time.

Sixth Basic Embodiment

A sixth basic embodiment of this invention is directed to an apparatus corresponding to the method in the second basic embodiment thereof. The sixth basic embodiment of this invention is similar to the fourth basic embodiment thereof except for design changes indicated hereinafter. In the case where a specified pattern indicating cell arrangement positions is located on or near first one of opposite sides of a two-dimensional code area, an inspection-line setting device calculates the positions of the centers of given cells on the basis of the specified pattern. The inspection-line setting device sets the calculated center positions as division points on the first one of the opposite sides. Regarding second one of the opposite sides, the inspection-line setting device executes a division-point setting process. The division-point setting process sets division pints on the second one of the opposite sides.

As previously mentioned, regarding first one of opposite sides of a two-dimensional code area which relates to a specified pattern indicating cell arrangement positions, the positions of the centers of given cells are calculated on the basis of the specified pattern. The calculated center positions are set as division points on the first one of the opposite sides. On the other hand, the division-point setting process sets division points on second one of the opposite sides through calculation.

The division points which coincide with the positions of the centers of the given cells are determined by the process including a step of scanning the image of the two-dimensional code. Accordingly, errors of these division points from correct positions on the actual two-dimensional code are smaller than those of division points determined by a full calculation process.

Inspection lines are set which connect corresponding ones of the division points on the opposite sides. Subsequently, cell positions are determined on the basis of the inspection lines. Since the division points have smaller errors as previously mentioned, the determined cell positions are more accurate. Thus, it is possible to more correctly read and decode-the two-dimensional code.

Seventh Basic Embodiment

A seventh basic embodiment of this invention is similar to the sixth basic embodiment thereof except for design changes indicated hereinafter. The seventh embodiment of this invention is directed to a two-dimensional code reading apparatus designed to be capable of handling a two-dimensional code area which is distorted by a positionally slant relation between an image sensor and a plane of a two-dimensional code.

With reference to FIG. 7, in the case where a two-dimensional code ABCD is rotated from its normal position about the Z axis, a specified pattern represented by a linear timing cell array in the two-dimensional code ABCD has a non-zero slope with respect to a main scanning direction or a sub scanning direction of a CCD image sensor. The linear timing cell array has a line of the alternation of white cells and black cells (that is, bright cells and dark cells). Each black cell (each dark cell) in the linear timing cell array is expressed as a plurality of pixels in an image of the two-dimensional code ABCD.

The coordinates of the centers of plural-pixel dark-cell-corresponding portions (dark portions) in the image are used as the positions of the centers of given cells. A group of pixels corresponding to one dark cell is scanned along the main scanning direction and the sub scanning direction, and two pixels located at outermost positions in the pixel group are detected and selected for each of the main scanning direction and the sub scanning direction. Coordinates of the position intermediate between the two outermost pixels in the main scanning direction, and the position intermediate between the two outermost pixels in the sub scanning direction are calculated as an indication of the location of the center of each plural-pixel dark-cell-corresponding portion in the image.

The main scanning direction and the sub scanning direction mean directions along which the pixels composing the image are arranged. In the case where a CCD image sensor is used, the main scanning direction and the sub scanning direction mean directions agree with those of the CCD image sensor.

Figure 11:
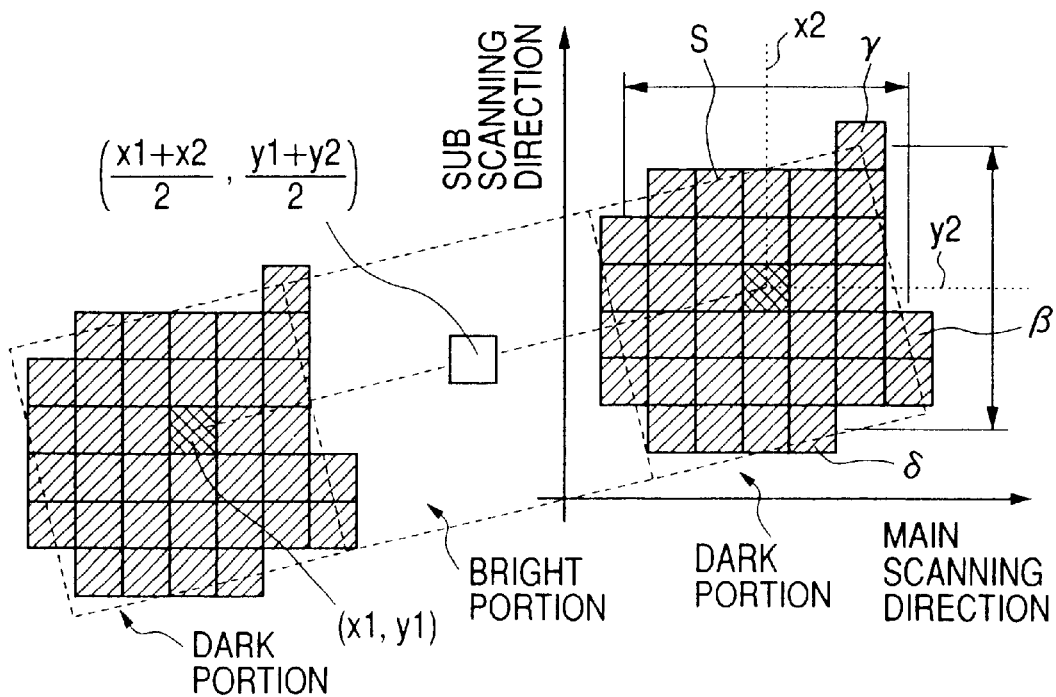
FIG. 11 is a diagram of a portion of a slant image of a linear timing cell array.

With reference to FIG. 11, a pixel group "S" corresponding to one dark portion in an image of a linear timing cell array is scanned along the main scanning direction and the sub scanning direction. In the main scanning direction, two pixels "α" and "β" located at outermost positions in the pixel group "S" are selected. The main-scanning-direction position x2 of the dark portion is set to the position intermediate between the pixels "α" and "β". In the sub scanning direction, two pixels "γ" and "δ" located at outermost positions in the pixel group "S" are selected. The sub-scanning-direction position y2 of the dark portion is set to the position intermediate between the pixels "γ" and "δ".

Thus, the coordinates of the centers of dark portions in a slant image of a linear timing cell array can be quickly calculated. The calculated centers of the dark portions are used as division points, and inspection lines are set in response to the division points. In this case, the time taken to set the inspection lines can be short. Therefore, it is possible to decode a two-dimensional code in a short time.

Eighth Basic Embodiment

An eighth basic embodiment of this invention is similar to the sixth basic embodiment or the seventh basic embodiment thereof except for design changes indicated hereinafter.

In the eighth basic embodiment of this invention, the coordinates of the centers of plural-pixel bright-cell-corresponding portions (bright portions) in an image of a linear timing cell array are used as the positions of the centers of given cells. The coordinates of the centers of the bright portions are calculated from the coordinates of the centers of dark portions in the image of the linear timing cell array.

In the case where the coordinates of two dark portions are given as (x1, y1) and (x2, y2) respectively, the coordinates (x0, y0) of the center of a bright portion between the two dark portions is calculated according to the equations as "x0=(x1+x2)/2" and "y0=(y1+y2)/2".

Thus, the coordinates of the centers of bright portions in a slant image of a linear timing cell array can be quickly calculated. The calculated centers of the bright portions are used as division points, and inspection lines are set in response to the division points. In this case, the time taken to set the inspection lines can be short. Therefore, it is possible to decode a two-dimensional code in a short time.

Preferably, the coordinates of the center of a bright portion is calculated from the coordinates of two dark portions between which the bright portion is adjacently located. The coordinates of the center of a bright portion may be calculated from the coordinates of dark portions different from dark portions between which the bright portion is adjacently located.

Ninth Basic Embodiment

A ninth basic embodiment of this invention is directed to an apparatus corresponding to the method in the third basic embodiment thereof. The ninth basic embodiment of this invention is similar to one of the fourth, fifth, sixth, seventh, and eighth basic embodiments thereof except for design changes indicated hereinafter.

In the ninth basic embodiment of this invention, a segment (a line segment) is drawn from one end of an object side to a side opposite to the object side along a direction parallel to a side (a reference adjacent side) extending from the other end of the object side. Then, division points are set on the object side in response to the ratio in length between the segment and the reference adjacent side.

The division points on a side are used as approximations to cell arrangement positions or bar-code positions on the side. A one-dimensional distortion of the side is calculated as the positions of the division points thereon. Inspection lines are set which connect corresponding ones of the division points. In this case, errors of the cell arrangement positions or the bar-code positions in a two-dimensional code area can be calculated. Therefore, it is possible to quickly determine suitable cell positions for the detection of the types (the states) of the cells or suitable bar-code positions. Also, the two-dimensional code can be accurately read and decoded in a short time.

Tenth Basic Embodiment

A tenth basic embodiment of this invention is based on one of the first, second, and third basic embodiments thereof. The tenth basic embodiment of this invention is directed to a recording medium which stores a computer program for implementing the method in one of the first, second, and third basic embodiments of this invention.

Preferably, the recording medium is of a magnetic type, a magneto-optical type, or an optical type. Examples of the recording medium are a floppy disk, a magneto-optical disk, or a CD-ROM. The recording medium may be a ROM or a RAM.

First Specific Embodiment

Figure 12:
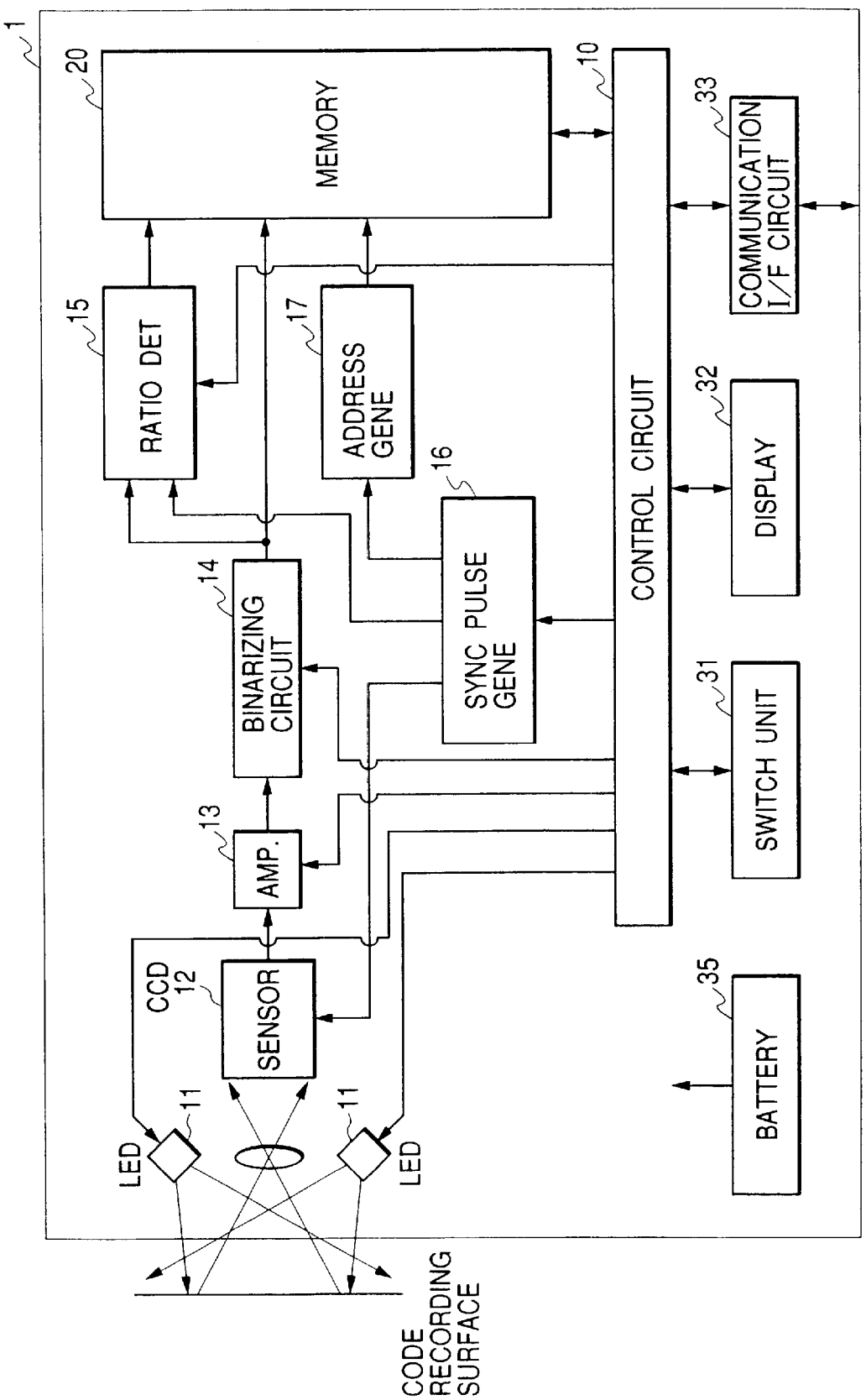
FIG. 12 is a block diagram of a two-dimensional code reading apparatus according to a first specific embodiment of this invention.

FIG. 12 shows a two-dimensional code reading apparatus 1 according to a first specific embodiment of this invention. The two-dimensional code reading apparatus 1 includes a control circuit 10, light emitting diodes (LED's) 11, a CCD area sensor or a CCD image sensor 12, an amplifier circuit 13, a binarizing circuit 14, a specified-ratio detection circuit 15, a sync pulse generation circuit 16, an address generation circuit 17, a memory 20, a switch unit 31, a liquid crystal display 32, and a communication interface (I/F) circuit 33. Also, the two-dimensional code reading apparatus 1 contains a battery 35. The battery 35 is used as a power supply for activating the electric circuits and devices in the apparatus 1.

The control circuit 10 is connected to the light emitting diodes 11, the amplifier circuit 13, the binarizing circuit 14, the specified-ratio detection circuit 15, the sync pulse generation circuit 16, the memory 20, the switch unit 31, the liquid crystal display 32, and the communication interface circuit 33. The CCD area sensor 12 is connected to the amplifier circuit 13 and the sync pulse generation circuit 16. The amplifier circuit 13 is connected to the binarizing circuit 14. The binarizing circuit 14 is connected to the specified-ratio detection circuit 15 and the memory 20. The specified-ratio detection circuit 15 is connected to the memory 20. The sync pulse generation circuit 16 is connected to the address generation circuit 17. The address generation circuit 17 is connected to the memory 20.

The control circuit 10 includes a computer having a combination of a CPU, a ROM, a RAM, and an I/O port. The control circuit 10 operates in accordance with a program stored in the ROM. The program may be stored in the RAM. The device 10 controls the light emitting diodes 11, the amplifier circuit 13, the binarizing circuit 14, the specified-ratio detection circuit 15, the sync pulse generation circuit 16, the memory 20, the switch unit 31, the liquid crystal display 32, and the communication interface circuit 33.

The light emitting diodes 11 apply red illumination light (reading light) to a region containing a two-dimensional code being an object. The CCD area sensor 12 includes a two-dimensional photodiode array, and a CCD array connected to the photodiode array. The CCD area sensor 12 receives light from the region containing the two-dimensional code, and converts the received light into an electric signal representing a two-dimensional image of that region. The electric signal is of a predetermined line-by-line scanning format. The scanning process implemented by the CCD area sensor 12 is controlled by a sync signal fed from the sync pulse generation circuit 16. The CCD area sensor 12 outputs the electric signal to the amplifier circuit 13.

The device 13 amplifies the output signal of the CCD area sensor 12 at a gain determined by a gain control voltage fed from the control circuit 10. The amplifier circuit 13 outputs the amplification-resultant signal to the binarizing circuit 14.

The binarizing circuit 14 converts the output signal of the amplifier circuit 13 into a binary signal or a two-value signal in response to a threshold voltage determined by a control signal fed from the control circuit 10. The binarizing circuit 14 outputs the binary signal to the specified-ratio detection circuit 15 and the memory 20. The binary signal is stored into the memory 20 as digital two-value data (digital image data) representing the image of the region containing the two-dimensional code. The CCD area sensor 12 repetitively implements image detection. Each time the image detection is executed by the CCD area sensor 12, the digital image data in the memory 20 are updated.

The sync pulse generation circuit 16 produces a sync pulse signal having a frequency sufficiently higher than a maximum frequency of the output signal of the CCD area sensor 12. The sync pulse generation circuit 16 outputs the sync signal to the CCD area sensor 12, the specified-ratio detection circuit 15, and the address generation circuit 17. The address generation circuit 17 counts pulses in the sync signal, and generates an address signal in response to the count result. The address generation circuit 17 outputs the address signal to the memory 20. The writing of the digital image data into the memory 20 is implemented 8 bits by 8 bits. Specifically, 8-bit pieces of the digital image data are sequentially written into different storage segments in the memory 20 in response to the address signal.

The specified-ratio detection circuit 15 includes state change detectors which sense every state change from "1" to "0" and every state change from "0" to "1" in the output signal of the binarizing circuit 14. The specified-radio detection circuit 15 includes a first counter which counts pulses in the sync signal during every time interval between the moment of the occurrence of a state change from "0" to "1" and the moment of the occurrence of a following state change from "1" to "0". The result of the pulse count by the first counter indicates, for example, the length of a continuous bright portion (a continuous white portion) in the image represented by the output signal of the binarizing circuit 14. The specified-radio detection circuit 15 includes a second counter which counts pulses in the sync signal during every time interval between the moment of the occurrence of a state change from "1" to "0" and the moment of the occurrence of a following state change from "0" to "1". The result of the pulse count by the second counter indicates, for example, the length of a continuous dark portion (a continuous black portion) in the image represented by the output signal of the binarizing circuit 14. The specified-ratio detection circuit 15 includes a divider or a calculator which computes the ratio in length between the continuous bright portion and the continuous dark portion in response to an output signal of the first counter and an output signal of the second counter. The calculator generates and outputs a signal representing the ratio in length between the continuous bright portion and the continuous dark portion. The specified-ratio detection circuit 15 includes a comparator which determines whether ratios sequentially represented by the output signal of the calculator are equal to or different from a reference ratio sequence corresponding to a specified pattern in a two-dimensional code being an object. The reference ratio sequence is represented by a signal fed from, for example, the control circuit 10. The comparator outputs a digital signal representing the result of the determination. The output signal of the comparator is referred to as digital ratio detection data. The specified-ratio detection circuit 15 outputs the digital ratio detection data to the memory 20. Pieces of the digital ratio detection data are sequentially written into different storage segments in the memory 20 in response to the address signal.

The switch unit 31 includes a switch operated by a user to input a command to start a two-dimensional code reading and decoding process. In addition, the switch unit 31 includes a ten key and various function keys for inputting information. The liquid crystal display 32 is designed for 2-scale (2-tone) indication of information fed from the control circuit 10. The communication interface circuit 33 implements communication with an external apparatus (not shown). Specifically, the communication interface circuit 33 transmits data to the external apparatus via a light emitter. Furthermore, the communication interface circuit 33 receives a signal (for example, a command to wait for transmission, or a signal representing a program for operating a system) from the external apparatus via a light receiver.

Figure 13:
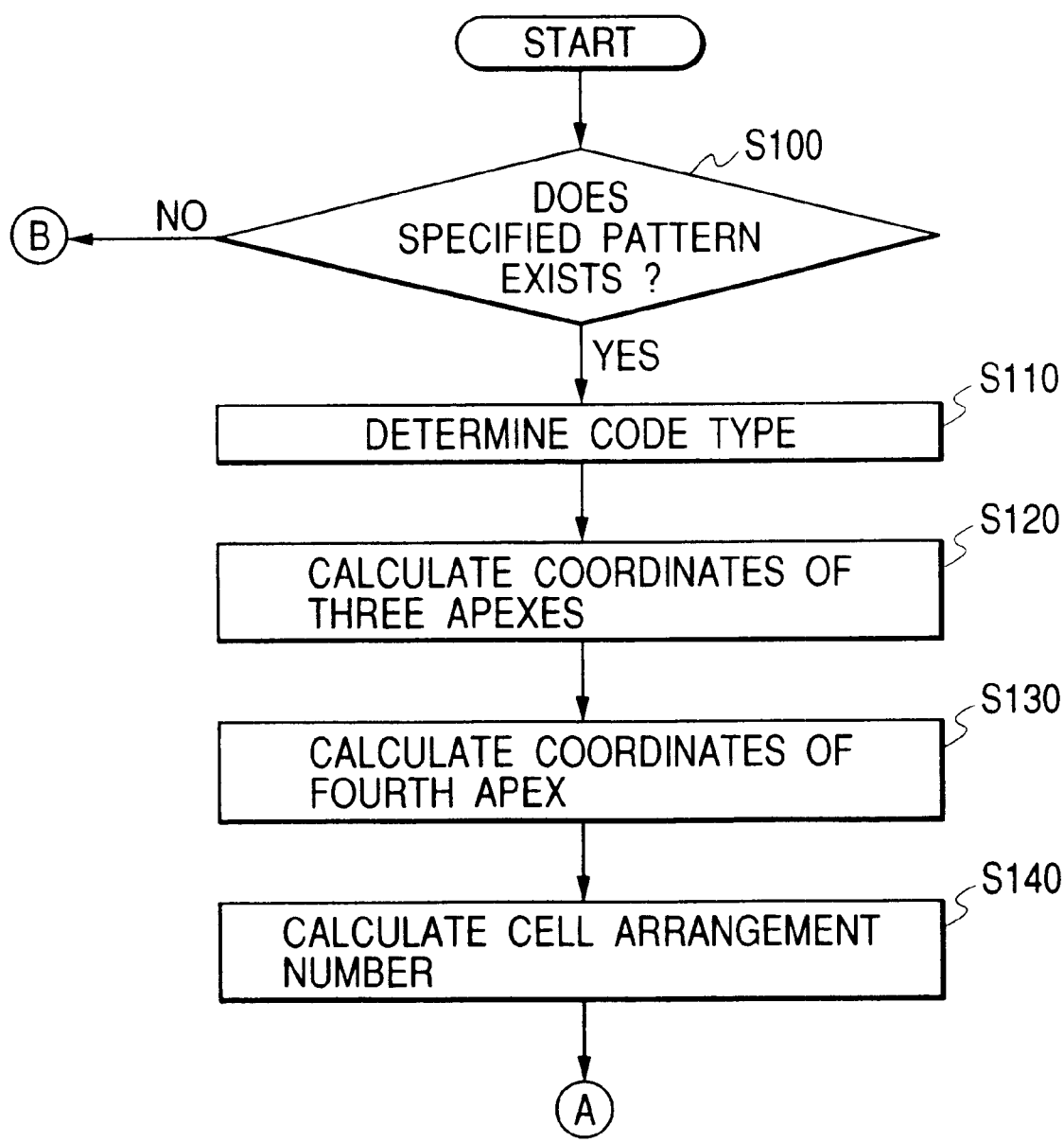
FIGS. 13 and 14 are a flowchart of a segment of a program for a control circuit in FIG. 12.
Figure 14:
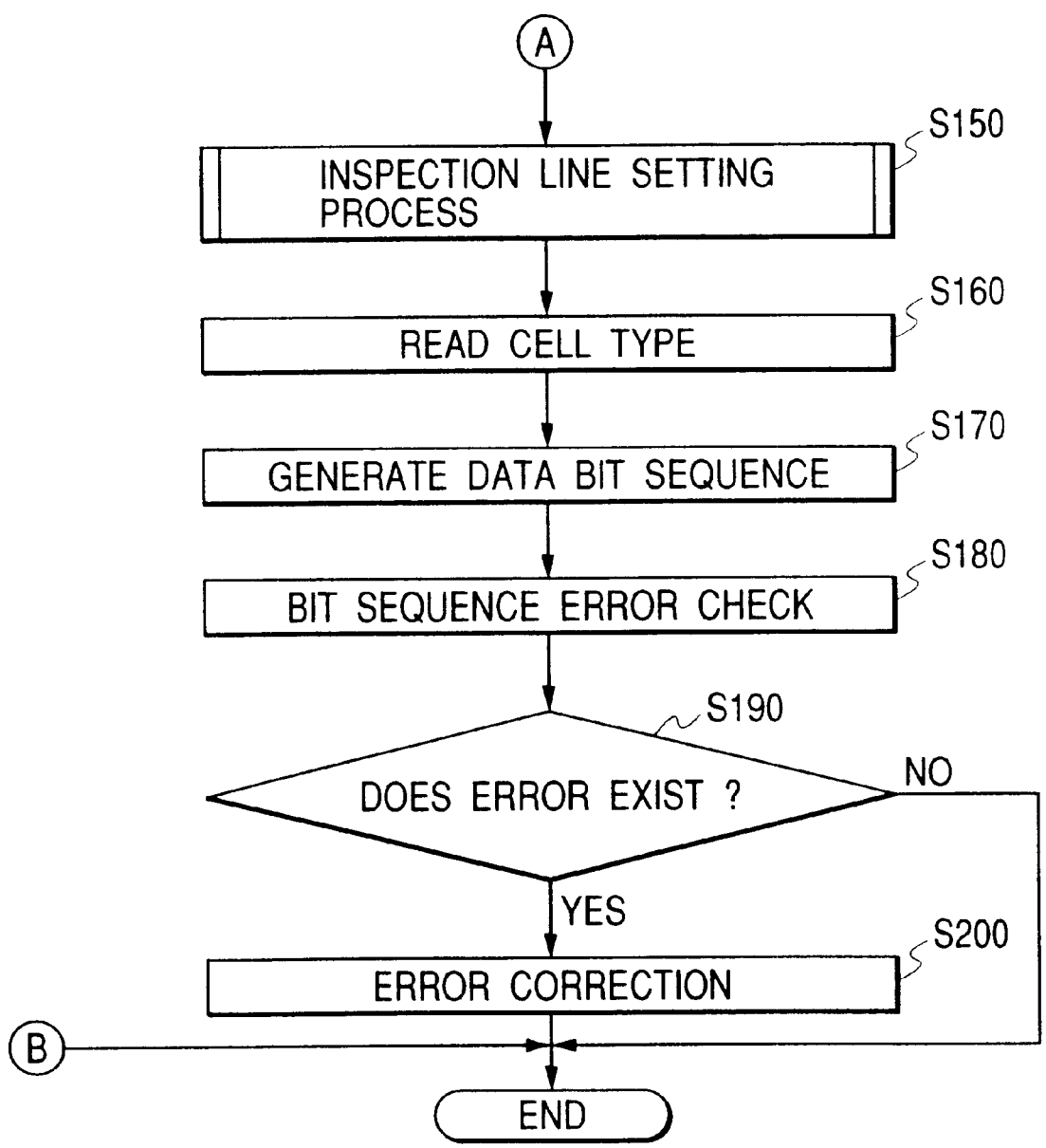

The control circuit 10 accesses the digital image data and the digital ratio detection data in the memory 20, and implements a two-dimensional code reading and decoding process in response to the digital image data and the digital ratio detection data. The digital image data may be multiple-value data different from two-value data. As previously mentioned, the control circuit 10 operates in accordance with a program. FIGS. 13 and 14 are a flowchart of a segment of the program which relates to the two-dimensional code reading and decoding process. The two-dimensional code reading and decoding process is designed for a two-dimensional code of a cell matrix type. The two-dimensional code of the cell matrix type is composed of cells representing unit pieces of binary coded data respectively. The cells are arranged in columns and rows forming a matrix configuration. Examples of the two-dimensional code of the cell matrix type are a QR code, a data code, a veri code, and a CP code.

With reference to FIGS. 13 and 14, a first step S100 of the program segment reads out the digital ratio detection data and the digital image data from the memory 20. The step S100 determines whether or not a specified pattern exists in the two-dimensional code on the basis of the digital ratio detection data and the digital image data. When the specified pattern exists, the program advances from the step S100 to a step S110. The specified pattern is sequentially selected from among predetermined patterns, and the determination as to the existence of the specified pattern is executed for each of the predetermined patterns. When the specified pattern does not exist, the program moves out of the step S100 and then the current execution cycle of the program segment ends (see FIG. 14). The specified patterns are represented by positioning symbols and linear timing cell arrays in the two-dimensional code.

A positioning symbol in a QR code has bright and dark portions (that is, white and black portions). The ratio in length among the bright and dark portions remains equal to a predetermined ratio as "1 (dark): 1 (bright): 3 (dark): 1 (bright): 1 (dark)" independent of the scanning direction. The ratio in length among the bright and dark portions which is equal to the predetermined ratio is detected by the specified-ratio detection circuit 15. Accordingly, regarding a QR code, the determination as to the existence of a positioning-symbol-related specified pattern is implemented by referring to the digital ratio detection data. Each of the bright portions is formed by a bright cell or bright cells (a white cell or white cells). Each of the dark portions is formed by a dark cell or dark cells (a black cell or black cells).

A data code has a rectangular shape. Two adjacent sides among four sides of the rectangular shape are formed by positioning symbols each composed of sequentially-arranged dark cells (black cells) only. In some cases, the cell arrangement in each of the positioning symbols has a non-zero slope with respect to the main scanning direction or the sub scanning direction. Accordingly, regarding a data code, the determination as to the existence of a positioning-symbol-related specified pattern is implemented by referring to the digital image data.

A linear timing cell array in a two-dimensional code has a line of the alternation of bright cells and dark cells (white cells and black cells). In some cases, the linear timing cell array has a non-zero slope with respect to the main scanning direction or the sub scanning direction. Accordingly, regarding a linear timing cell array, the determination as to the existence of a specified pattern is implemented by referring to the digital image data.

The step S110 determines the type of the two-dimensional code on the basis of the specified pattern detected by the step S100. The step S110 scans a linear timing cell array or arrays in response to the determined code type. The scanned linear timing cell array or arrays are in the image represented by the digital image data in the memory 20.

A step S120 following the step S110 calculates the coordinates of three apexes of a two-dimensional code area on the basis of the code type determined by the step S110 and the specified pattern detected by the step S100. Since the two-dimensional code being the object has a rectangular shape or a square shape, a two-dimensional code area in the image represented by the digital image data in the memory 20 has a quadrilateral shape even in the case where the CCD area sensor 12 is slant or oblique with respect to a plane of the two-dimensional code. The horizontal direction and the vertical direction with respect to the photodiode array in the CCD area sensor 12 correspond to the main scanning direction and the sub scanning direction, respectively. The coordinates are defined by an X axis and a Y axis which agree with the main scanning direction and the sub scanning direction respectively. The image represented by the digital image data in the memory 20 is composed of pixels at different positions expressed as different coordinates respectively. The coordinates of the three apexes are given by the coordinates of three corresponding pixels among the pixels composing the image represented by the digital image data in the memory 20.

A step S130 subsequent to the step S120 calculates the coordinates of a fourth apex of the two-dimensional code area from the coordinates of the previously-mentioned three apexes and the digital image data in the memory 20.

A step S140 following the step S130 counts bright and dark portions (white and black portions) in each of the linear timing cell arrays scanned by the step S110. The step S140 calculates first and second cell arrangement numbers from the count numbers regarding the respective linear timing cell arrays. The first cell arrangement number is equal to the number of cells arranged in the two-dimensional code along the horizontal direction (the X-axis direction or the main scanning direction). The second cell arrangement number is equal to the number of cells arranged in the two-dimensional code along the vertical direction (the Y-axis direction or the sub scanning direction). In the case of a two-dimensional code where "m" cells are arranged in the horizontal direction while "n" cells are arranged in the vertical direction, the first and second cell arrangement numbers are equal to "m" and "n" respectively. Thus, the two-dimensional code is composed of "m" by "n" cells arranged in a matrix configuration.

A block S150 (see FIG. 14) subsequent to the step S140 implements an inspection-line setting process. The inspection-line setting process sets inspection lines connecting opposite sides in two pairs among the four sides which indicate the boundaries of the two-dimensional code area. The details of the inspection-line setting process will be mentioned later.

A step S160 following the block S150 calculates the positions of the intersections of the inspection lines. The step S160 uses the calculated positions of the intersections as the positions of the cells respectively. The step S160 sequentially reads out 1-cell-corresponding pieces of the digital image data from the memory 20 in response to the calculated positions of the intersections. The step S160 detects the types ("bright" or "dark", that is, "white" or "black") of the cells by referring to the logic states of the 1-cell-corresponding pieces of the digital image data. In other words, the step S160 determines whether each of the cells is bright or dark (that is, white or black).

A step S170 subsequent to the step S160 assigns each of the bright cells (the white cells) to a bit of "1". The step S170 assigns each of the dark cells (the black cells) to a bit of "0". The step S170 combines the bits into a data bit sequence.

A step S180 following the step S170 implements an error check on the data bit sequence. A step S190 subsequent to the step S180 determines whether or not the data bit sequence has at least one error by referring to the result of the error check implemented by the step S180. When the data bit sequence has at least one error, the program advances from the step S190 to a step S200. Otherwise, the program exits from the step S190 and then the current execution cycle of the program segment ends.

The step S200 subjects the data bit sequence to error correction. After the step S200, the current execution cycle of the program segment ends.

Figure 15:
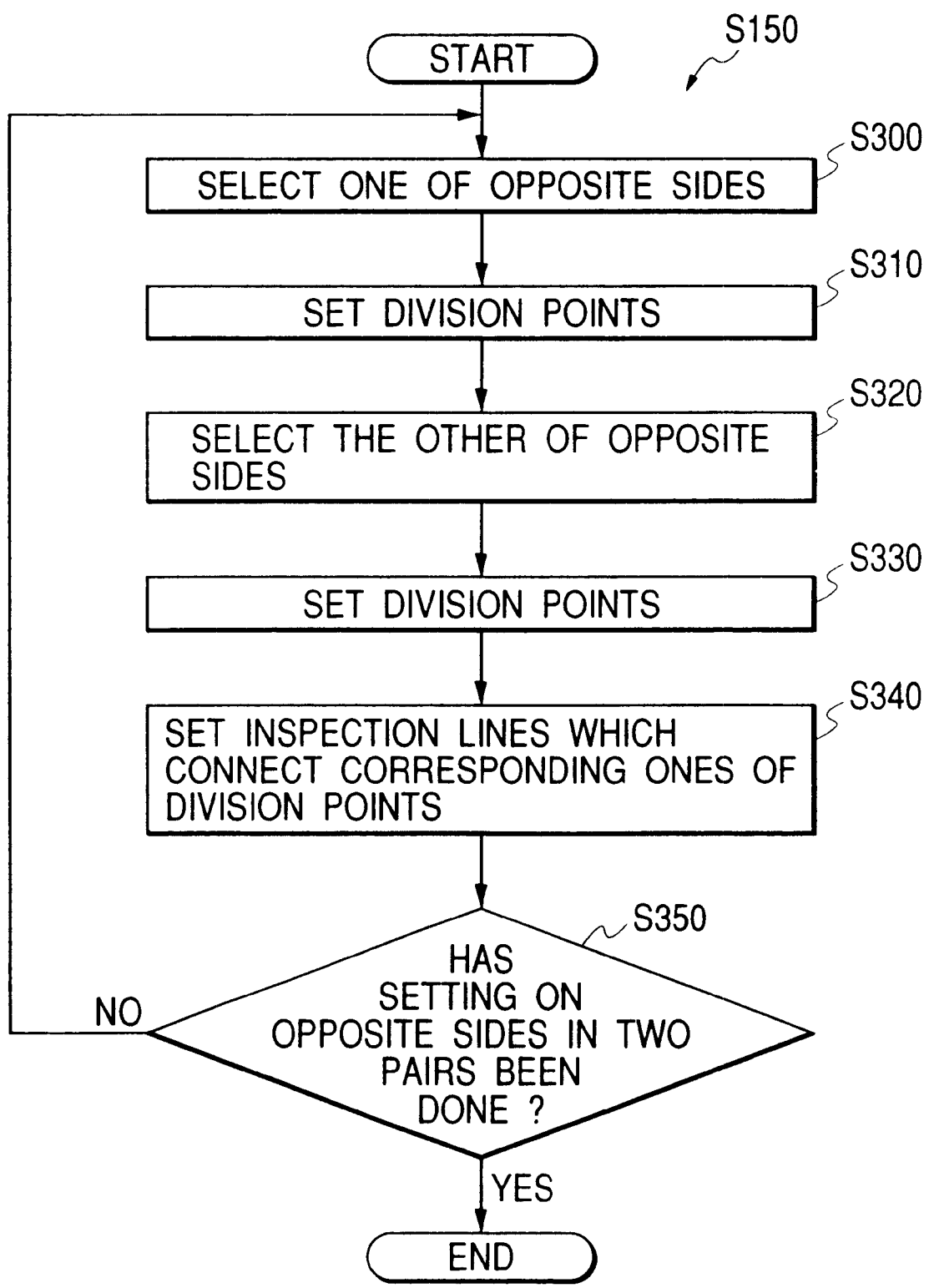
FIG. 15 is a flowchart of the details of a block in FIG. 14.

FIG. 15 shows the details of the block S150 in FIG. 14. As shown in FIG. 15, the block S150 includes a step S300 which follows the step S140 (see FIG. 13). The step S300 selects first one of two opposite sides of the two-dimensional code area. A step S310 subsequent to the step S300 implements a division-point setting process for the first one of the two opposite sides. The division-point setting process sets division points on the first one of the two opposite sides.

A step S320 following the step S310 selects second one of the two opposite sides of the two-dimensional code area. A step S330 subsequent to the step S320 implements the division-point setting process for the second one of the two opposite sides. The division-point setting process sets division points on the second one of the two opposite sides.

A step S340 following the step S330 sets inspection lines which connect corresponding ones of the division points on the two opposite sides. A step S350 subsequent to the step S340 determines whether or not inspection lines have been fully set between opposite sides in two pairs among the four sides of the two-dimensional code area. In the case where inspection lines have been fully set between opposite sides in two pairs among the four sides, the program advances from the step S350 to the step S160 of FIG. 14. Otherwise, the program returns from the step S350 to the step S300. As a result, the inspection lines are fully set between opposite sides in two pairs among the four sides of the two-dimensional code area.

As understood from the previous explanation, the inspection-line setting process sets division points on each of opposite sides, and then sets inspection lines which connect corresponding ones of the division points on the opposite sides. Thus, the inspection-line setting process features that each inspection line is set by calculating two points which the inspection line should meet. Therefore, the time taken to set the inspection lines is remarkably shorter than that in a prior-art method having an angle calculation step for each inspection line.

The division-point setting process implemented by the steps S310 and S330 will be explained in more detail. The division-point setting process sets division points on an object side in response to the ratio in length between two sides adjacent to the object side, and also the number of cell arrangements. A two-dimensional code area ABCD in FIG. 6 will be taken as an example.

With reference to FIG. 6, the setting of division points on the side AB is executed as follows. The lengths of the sides AD and BC which are adjacent to the side AB are calculated. The position Al of an i-th (i=0, 1, 2, . . . , n) division point "I" in the order as viewed from the apex "A" is set according to the following equation.

$$AI = \frac{i|BC|}{(n-i)|AD| + i|BC|} AB \quad (1)$$

where "n" denotes the cell arrangement number calculated by the step S140.

One of the apexes "C" and "D" separate from the side AB is moved while the lengths of the sides AD and BC remain unchanged, so that the two-dimensional code area ABCD is changed to a trapezoid having parallel sides AD (or AD') and BC' (or BC) adjacent to the side AB. In FIG. 6, the two-dimensional code area ABCD is changed to a trapezoid ABC'D.

Provided that the sides AD and BC adjacent to the side AB are parallel to each other, division points can be set on the side AB according to the previously-indicated equation (1). An original two-dimensional code is considered which has a square shape ABCD shown in FIG. 7. An X axis, a Y axis, and a Z axis which are perpendicular to each other are shown in FIG. 7. It is assumed that the two-dimensional code ABCD extends on the XY plane, and the side AB is parallel with the X axis. The two-dimensional code ABCD is composed of cells arranged along the X-axis direction and the Y-axis direction. The positions of cells (the positions of cell arrangements) in the X-axis direction are spaced at equal intervals. Similarly, the positions of cells (the positions of cell arrangements) in the Y-axis direction are spaced at equal intervals.

In the case where the two-dimensional code ABCD is rotated from its normal position about the Y axis and an image thereof is taken along the Z-axis direction, the two-dimensional code ABCD is read as an image which has a trapezoidal two-dimensional code area ABCD such as shown in FIG. 8. On the premise that the deformation is proportional in the X-axis direction and the Y-axis direction regarding the trapezoidal two-dimensional code area ABCD, the inter-cell interval in a region decreases as the region is closer to the side AD since the the length of the side AD is smaller than the length of the side BC in FIG. 8. The cell arrangement positions in the X-axis direction can be calculated on the basis of the ratio in length between the side (the upper base) AD and the side (the lower base) BC.

On the premise that the deformation of the two-dimensional code area from the original rectangular or square shape is proportional in both the X-axis direction and the Y-axis direction, the cell arrangement positions in the X-axis direction are calculated in a mathematical way while the the angle of the rotation about the Y-axis is considered. Specifically, with reference to FIG. 8, the position AK of a k-th (i=0, 1, 2, . . . , n) division point "K" in the order as viewed from the apex "A" is given by the following equation.

$$AK = \frac{i|BC|}{(n-i)|AD| + i|BC|} AH \quad (2)$$

where "H" denotes the intersection of the side BC and a line extending from the apex "A" and being perpendicular to the side BC. Thus, provided that the two-dimensional code area ABCD has a trapezoidal shape, division points on the side AB can be set on the basis of a length ratio similar to that in the X-axis direction, that is, on the basis of the lengths of the sides AD and BC.

When the two-dimensional code area ABCD is considered to be a trapezoidal two-dimensional code area ABC'D as shown in FIG. 6, division points approximating to cell arrangement positions can be set on the side AB in response to the lengths of the sides AD and BC (BC').

Similarly, division points can be set on the side DC in response to the lengths of the sides AD and BC. Specifically, the position DI of an i-th (i=0, 1, 2, . . . , n) division point "I" in the order as viewed from the apex "D" is set according to the following equation.

$$DI = \frac{i|BC|}{(n-i)|AD| + i|BC|} DC \quad (3)$$

where "n" denotes the cell arrangement number calculated by the step S140.

As understood from the previously-indicated equations (1)–(3), the division points on the side AB and the division points on the side DC depend on the ratio in length between the sides AD and BC adjacent to the sides AB and DC but are unrelated to the trapezoid formed by the two-dimensional code area ABC'D. Thus, the division points on the side AB and the division points on the side DC are set on the basis of the same length ratio.

Considering the two-dimensional code area ABCD to be a trapezoid is proper for the following reason. Using the trapezoid ABC'D as an approximation to the two-dimensional code area ABCD (see FIG. 6) means that in calculation of the distortion of the side AB, a change in length of the side DC opposite to the side AB does not affect the distortion of the side AB. Thus, in calculation of the distortion of the side AB, the length of the side DC opposite to the side AB may be changed provided that the lengths of the sides AD and BC adjacent thereto remain unchanged.

Obliquely reading the two-dimensional code ABCD means taking an image thereof under the conditions where the two-dimensional code ABCD is rotated from its normal position about the X axis, the Y axis, or the Z axis (see FIG. 7). Rotation of the two-dimensional code ABCD about the Z axis does not cause any distortion in its image. As shown in FIGS. 7 and 9, rotation of the two-dimensional code ABCD about the X axis causes a distortion of its image in the Y-axis direction, that is, a distortion on the sides AD and BC. Thus, the intervals between the cell arrangement positions on the sides AD and BC are unequal. As shown in FIGS. 7 and 8, rotation of the two-dimensional code ABCD about the Y axis causes a distortion of its image in the X-axis direction, that is, a distortion on the sides AB and DC. Thus, the intervals between the cell arrangement positions on the sides AB and DC are unequal. As understood from the previous explanation, a change in length of the side DC relative to the side AB is caused by rotation of the two-dimensional code ABCD about the X axis. At this time, conditions of the distortion of the side AB remain unchanged. Accordingly, a distortion of the side AB is caused when the ratio in length between the sides AD and BC changes. On the other hand, the distortion of the side AB remains unchanged even when the length of the side DC changes. Therefore, the length of a side opposite to an object side may be changed provided that the lengths of two sides adjacent to the object side remain unchanged (specifically, the ratio in length between two sides adjacent to the object side remains unchanged). A trapezoid which results from changing a side opposite to an object side can be used as an approximation to a two-dimensional code area (see FIG. 6).

As previously mentioned, a trapezoid having given conditions can be approximate to a two-dimensional code area, and division points on an object side can be set on the basis of the ratio in length between two sides adjacent to the object side. For each of opposite sides, division points which approximate to cell arrangement positions on the side are actually set in such a way. Inspection lines are set which connect corresponding ones of the division points. In this case, errors of the positions of cell arrangements can be calculated. When inspection lines are set which connect opposite sides in two pairs, two-dimensional errors of the positions of cells can be calculated. Accordingly, even in the case where the CCD area sensor 12 is slant or oblique with respect to a plane of the two-dimensional code so that a read image of the two-dimensional code is distorted, it is possible to accurately decode the two-dimensional code.

As previously mentioned, inspection lines are set by simple calculation steps corresponding to an operation of setting division points on each of opposite sides (the steps S300, S310, S320, and S330 in FIG. 15), and an operation of connecting the division points (the step S340 in FIG. 15). Therefore, the time taken to set the inspection lines is remarkably shorter than that in a prior-art method having an angle calculation step for each inspection line. Thus, even in the case where an image of a two-dimensional code is distorted, the two-dimensional code can be accurately decoded in a short time.

Second Specific Embodiment

A second specific embodiment of this invention is directed to an apparatus for reading a two-dimensional code of a cell matrix type which contains a specified pattern such as a linear timing cell array or a positioning symbol. The linear timing cell array has a line of the alternation of white cells and black cells (that is, bright cells and dark cells). The linear timing cell array indicates cell arrangement positions. In the case where the two-dimensional code is a QR code, the positioning symbol has such a pattern that frequency components corresponding to two scanning directions are equal. In the QR code, one positioning symbol corresponds to seven cells, and hence indicates cell arrangement positions.

The two-dimensional code reading apparatus in the second specific embodiment of this invention uses the specified pattern in reading and decoding the two-dimensional code of the cell matrix type. The two-dimensional code of the cell matrix type is composed of cells representing unit pieces of binary coded data respectively. The cells are arranged in columns and rows forming a matrix configuration. Examples of the two-dimensional code of the cell matrix type are a QR code and a data code. The two-dimensional code reading apparatus in the second specific embodiment of this invention is similar to the two-dimensional code reading apparatus in the first specific embodiment thereof except for design changes indicated hereinafter.

Figure 16:
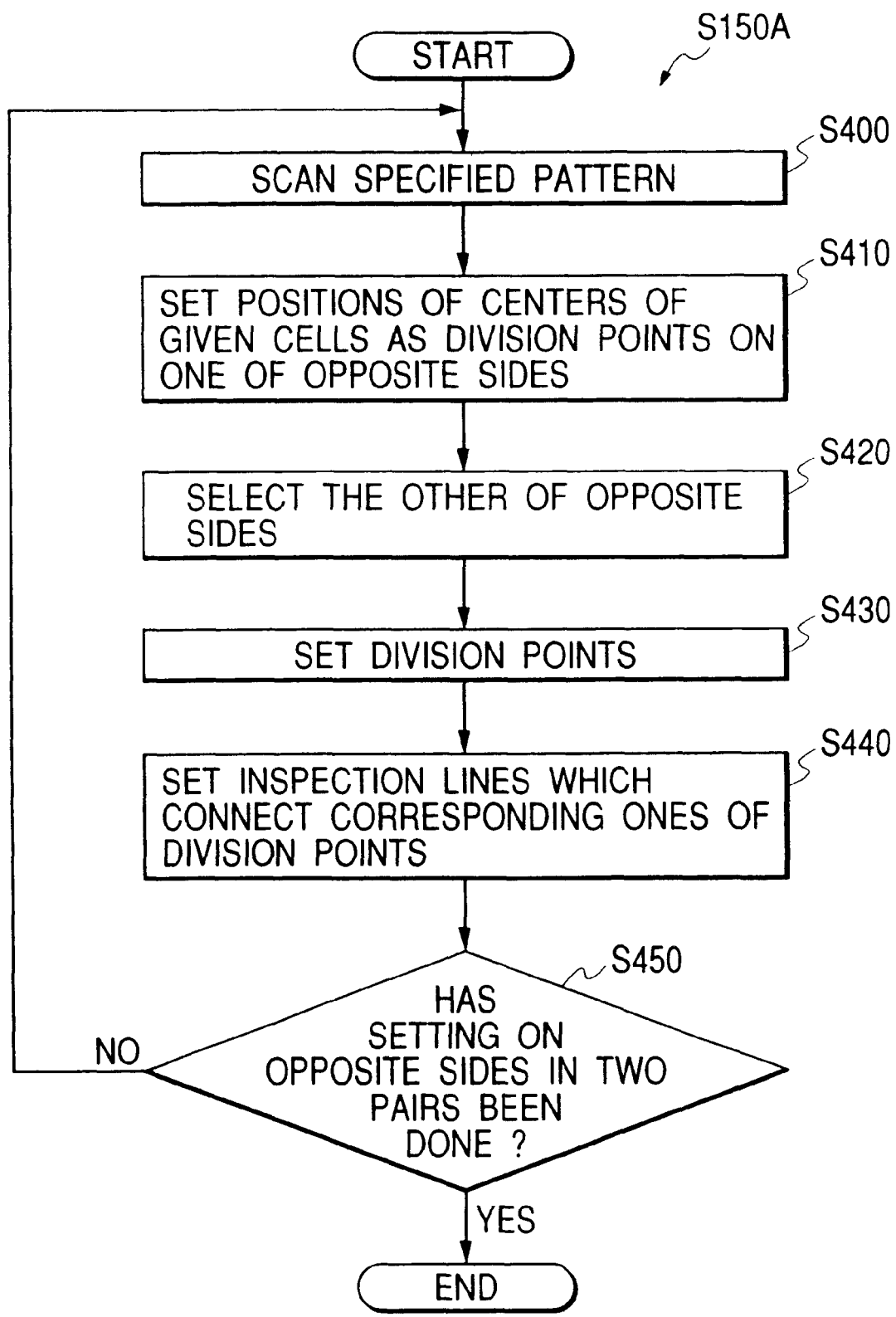
FIG. 16 is a flowchart of the details of a block in a program in a second specific embodiment of this invention.

A program segment in the second specific embodiment of this invention includes a block S150A which replaces the block S150 in FIG. 14. FIG. 16 shows the details of the block S150A. As shown in FIG. 16, the block S150A includes a step S400 which follows the step S140 (see FIG. 13). The step S400 scans a specified pattern in the image represented by the digital image data in the memory 20 (see FIG. 12). The specified pattern indicates cell arrangement positions.

In general, the specified pattern indicative of the cell arrangement positions is represented by, for example, a linear timing cell array located on or near one of opposite sides. In a data code, one of opposite sides is formed by a linear timing cell array having a specified pattern indicating cell arrangement positions. In a veri code or a CP code, a linear timing cell array having a specified pattern indicative of cell arrangement positions is located immediately inward of one of opposite sides. In a QR code, a positioning symbol and a linear timing cell array having specified patterns indicative of cell arrangement positions are located on or near one of opposite sides.

A step S410 following the step S400 calculates the positions of the centers of given cells on the basis of the scanned specified pattern and the code type determined by the step S110 (see FIG. 13). For example, in the case where the specified pattern is indicated by a linear timing cell array, the positions of the centers of white and black cells (bright and dark cells) composing the array are computed. In the case where the specified pattern is located on or near first one of two opposite sides of the two-dimensional code area, the step S410 sets the calculated positions of the centers of the given cells as division points on the first one of the two opposite sides.

The horizontal direction and the vertical direction with respect to the photodiode array in the CCD area sensor 12 (see FIG. 12) correspond to the main scanning direction and the sub scanning direction, respectively. The coordinates are defined by an X axis and a Y axis which agree with the main scanning direction and the sub scanning direction respectively. The positions of the centers of the given cells are expressed as coordinates defined by the main scanning direction and the sub scanning direction.

For example, each dark portion in the image of a linear timing cell array is composed of plural pixels. The coordinates of the center of a dark portion in the image of the linear timing cell array is calculated while consideration is given to the case where the linear timing cell array has a non-zero slope with respect to the main scanning direction or the sub scanning direction of the CCD area sensor 12 as shown in FIG. 11.

With reference to FIG. 11, a pixel group "S" corresponding to one dark portion in the image of the linear timing cell array is scanned along the main scanning direction and the sub scanning direction. In the main scanning direction, two pixels "α" and "β" located at outermost positions in the pixel group "S" are selected. The main-scanning-direction position x2 of the dark portion is set to the position intermediate between the pixels "α" and "β". In the sub scanning direction, two pixels "γ" and "δ" located at outermost positions in the pixel group "S" are selected. The sub-scanning-direction position y2 of the dark portion is set to the position intermediate between the pixels "γ" and "δ".

The coordinates of the centers of bright portions in the image of the linear timing cell array are calculated from the coordinates of the centers of dark portions therein. In the case where the coordinates of two dark portions are given as (x1, y1) and (x2, y2) respectively as shown in FIG. 11, the coordinates (x0, y0) of the center of a bright portion between the two dark portions is calculated according to the equations as "x0=(x1+x2)/2" and "y0=(y1+y2)/2".

Thus, even in a slant image of a linear timing cell array, the coordinates of the centers of dark portions and bright portions can be quickly calculated. Accordingly, the time taken to set the inspection lines can be short.

With reference back to FIG. 16, a step S420 following the step S410 selects second one of the two opposite sides of the two-dimensional code area. A step S430 subsequent to the step S420 implements a division-point setting process for the second one of the two opposite sides. The division-point setting process sets division points on the second one of the two opposite sides. The steps S420 and S430 are similar to the steps S320 and S330 in FIG. 15, respectively.

A step S440 following the step S430 sets inspection lines which connect corresponding ones of the division points on the two opposite sides. A step S450 subsequent to the step S440 determines whether or not inspection lines have been fully set between opposite sides in two pairs among the four sides of the two-dimensional code area. In the case where inspection lines have been fully set between opposite sides in two pairs among the four sides, the program advances from the step S450 to the step S160 of FIG. 14. Otherwise, the program returns from the step S450 to the step S400. As a result, the inspection lines are fully set between opposite sides in two pairs among the four sides of the two-dimensional code area.

As previously mentioned, the positions of the centers of given cells are calculated on the basis of the specified pattern in the image represented by the digital image data in the memory 20 (see FIG. 12). For example, in the case where the specified pattern is indicated by a linear timing cell array, the positions of the centers of white and black cells (bright and dark cells) composing the array are computed. Then, the calculated center positions are set as division points on the first one of the opposite sides. As previously mentioned, division points are set on the second one of the opposite sides by the division-point setting process.

The division points which coincide with the positions of the centers of the given cells are determined by the process including a step of scanning the image of the two-dimensional code which is represented by the digital image data in the memory 20 (see FIG. 12). Accordingly, errors of these division points from correct positions on the actual two-dimensional code are smaller than those of division points determined by a full calculation process.

As previously mentioned, inspection lines are set which connect corresponding ones of the division points on the opposite sides. Subsequently, cell positions are determined on the basis of the inspection lines. Since the division points have smaller errors, the determined cell positions are more accurate. Thus, it is possible to more correctly read and decode the two-dimensional code. Since the setting of the inspection lines is implemented by the process exclusive of angle calculation, the decoding time can be shorter than that in a prior-art method having an angle calculation step for each inspection line.

Third Specific Embodiment

A third specific embodiment of this invention is directed to an apparatus for reading a two-dimensional code of a bar-code stack type. The two-dimensional code of the bar-code stack type has a stack of bar codes representing portions of data respectively. The stack extends in a direction perpendicular to the longitudinal directions of the bar codes. The two-dimensional code reading apparatus in the third specific embodiment of this invention is similar to the two-dimensional code reading apparatus in the first specific embodiment or the second specific embodiment thereof except for design changes indicated hereinafter.

Figure 17:
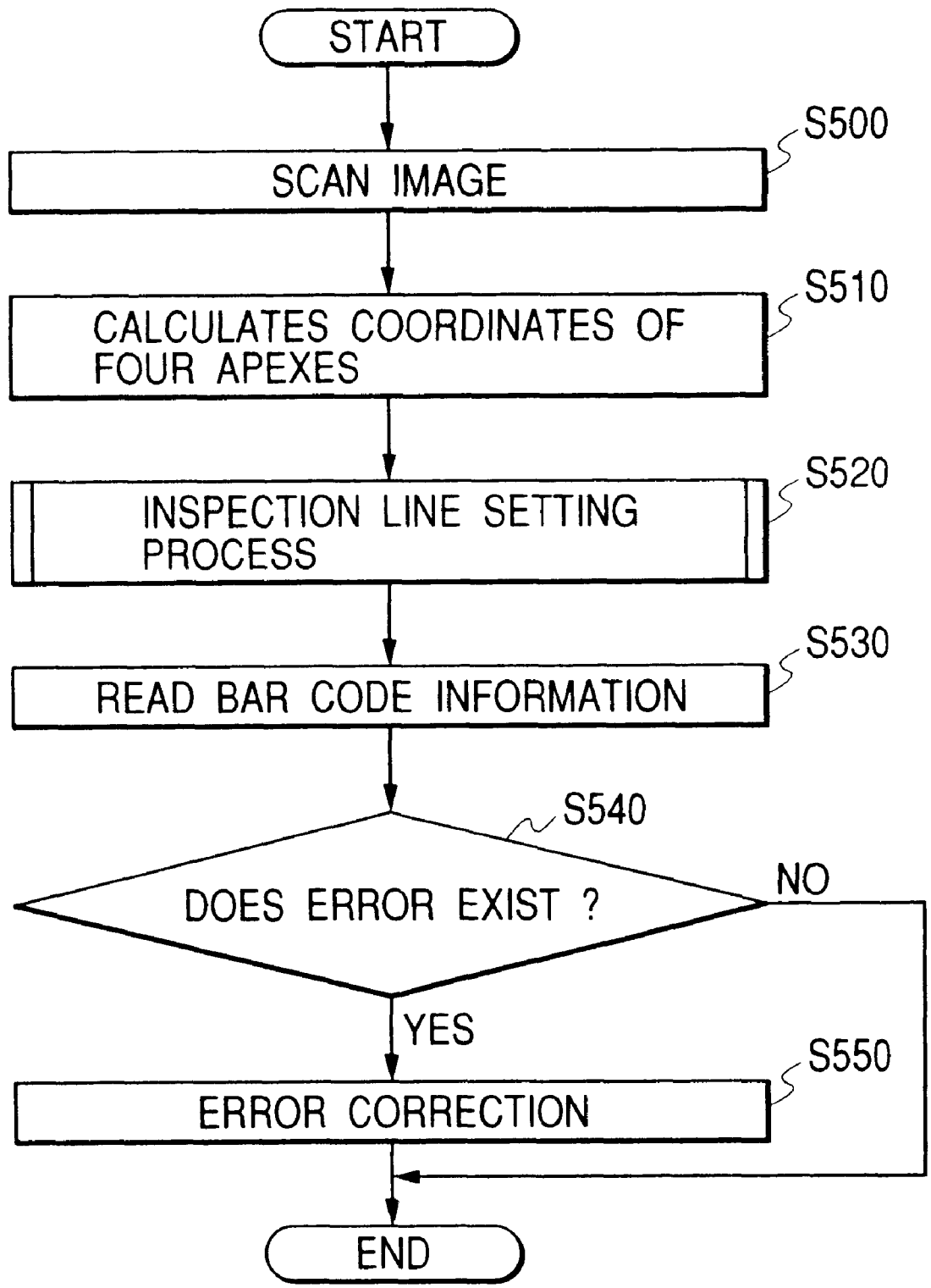
FIG. 17 is a flowchart of a segment of a program in a third specific embodiment of this invention.

FIG. 17 is a flowchart of a segment of a program which relates to a two-dimensional code reading and decoding process implemented in the third specific embodiment of this invention. With reference to FIG. 17, a first step S500 of the program segment scans the image represented by the digital image data in the memory 20 (see FIG. 12). A step S510 following the step S500 calculates the coordinates of the four apexes of a two-dimensional code area of a quadrilateral shape in the scanned image.

A block S520 subsequent to the step S510 implements an inspection-line setting process by which inspection lines are sets on opposite sides in one pair among the four sides indicating the boundaries of the two-dimensional code area. The opposite sides are substantially perpendicular to the longitudinal directions of the bar codes. The details of the block S520 will be mentioned later.

A step S530 following the block S520 scans the image along the inspection lines, and hence reads out data portions (information pieces) from the respective bar codes. A step S540 subsequent to the step S530 determines whether or not a combination of the bar-code data portions (the bar-code information pieces) has at least one error. When the combination of the bar-code data portions has at least one error, the program advances from the step S540 to a step S550. Otherwise, the program exits from the step S540 and then the current execution cycle of the program segment ends. The step S550 subjects the combination of the bar-code data portions to error correction. After the step S550, the current execution cycle of the program segment ends.

Figure 18:
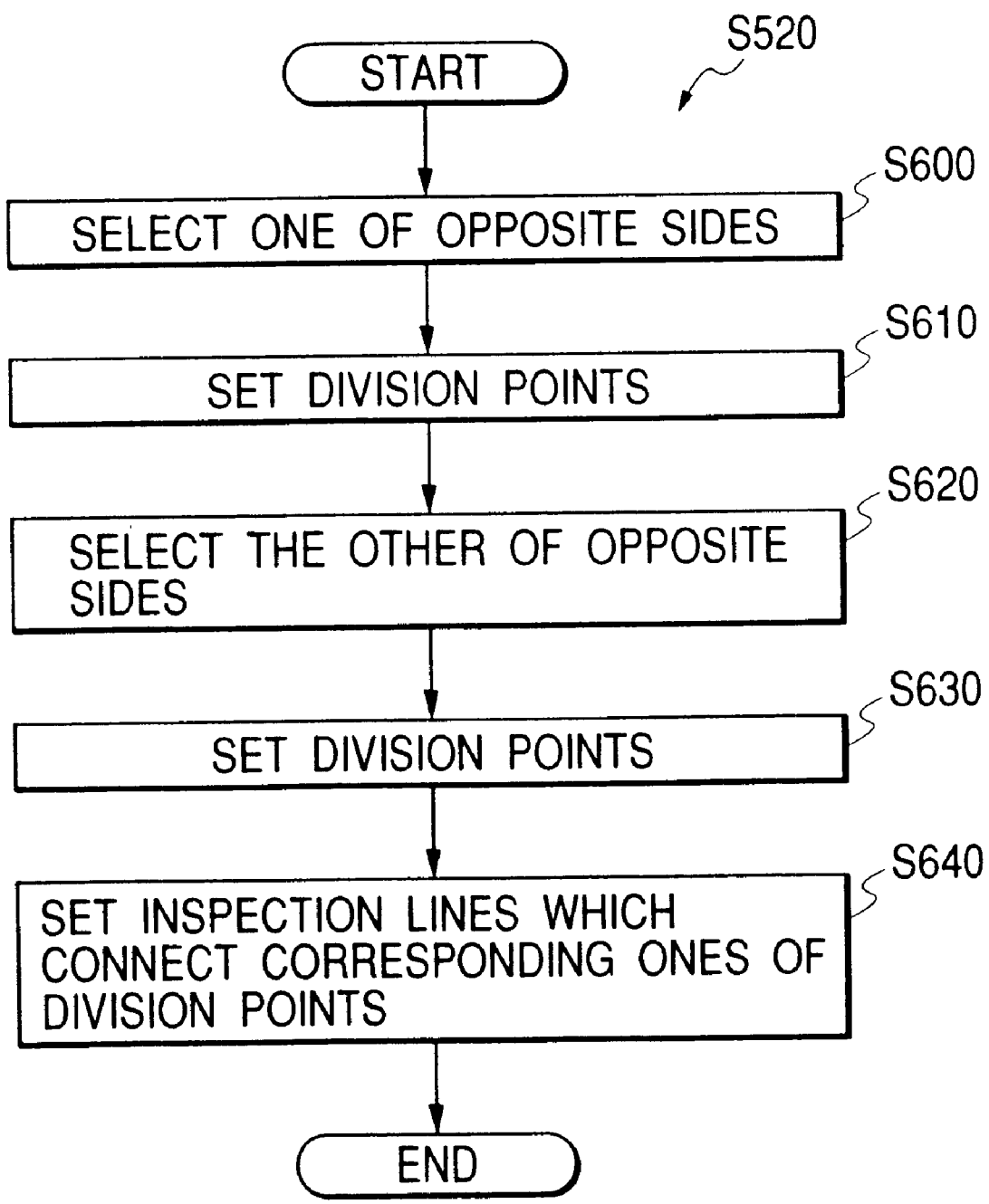
FIG. 18 is a flowchart of the details of a block in FIG. 17.

FIG. 18 shows the details of the block S520 in FIG. 17. As shown in FIG. 18, the block S520 includes a step S600 which follows the step S510 (see FIG. 17). The step S600 selects first one of two opposite sides of the two-dimensional code area. The two opposite sides are substantially perpendicular to the longitudinal directions of the bar codes. A step S610 subsequent to the step S600 implements a division-point setting process for the first one of the two opposite sides. The division-point setting process sets division points on the first one of the two opposite sides. The division-point setting process is basically similar to that in the first specific embodiment or the second specific embodiment of this invention except for the following point. The setting of the division points depends on a bar-code stack number. The bar-code stack number is defined as the number of the bar codes stacked to compose the two-dimensional code.

A step S620 following the step S610 selects second one of the two opposite sides of the two-dimensional code area. A step S630 subsequent to the step S620 implements the division-point setting process for the second one of the two opposite sides. The division-point setting process sets division points on the second one of the two opposite sides. A step S640 following the step S630 sets inspection lines which connect corresponding ones of the division points on the two opposite sides. After the step S640, the program advances to the step S530 of FIG. 17.

As a result of the execution of the inspection-line setting process, inspection lines are set which connect opposite sides in one pair among the four sides indicating the boundaries of the two-dimensional code area. The opposite sides are substantially perpendicular to the longitudinal directions of the bar codes. Specifically, division points are set on each of the opposite sides of the two-dimensional code area. The division points are used as approximations to the bar-code positions on the opposite sides. Inspection lines are set which connect corresponding ones of the division points on the opposite sides. Thus, the inspection lines are designed to cancel errors of the bar-code positions due to an image distortion in a direction perpendicular to the longitudinal directions of the bar codes. Accordingly, even in the case where an image of a two-dimensional code is distorted, bar-code positions suitable for reading data portions from bar codes can be quickly determined. Therefore, the two-dimensional code can be accurately read and decoded in a short time.

Fourth Specific Embodiment

A fourth specific embodiment of this invention is similar to the first, second, or third specific embodiment thereof except for the division-point setting process. The division-point setting process in the fourth specific embodiment of this invention is as follows.

The division-point setting process calculates the length of a segment (a line segment) which extends from one end of an object side to a side opposite to the object side along a direction parallel to a side (a reference adjacent side) starting from the other end of the object side. Then, division points are set on the object side in response to the ratio in length between the segment and the reference adjacent side. Here, the side opposite to the object side means not only an original side but also an extension of the original side.

A two-dimensional code area ABCD in FIG. 10 will be taken as an example. A line parallel with the side AD is drawn from the end B of the side AB, and the intersection of this line and an extension of the side DC is denoted by the character C". The length of the line segment BC" is calculated. Division points on the side AB are set in response to the length of the line segment BC" and the length of the side AD. Specifically, the position AI of an i-th (i=0, 1, 2, ..., n) division point "I" in the order as viewed from the apex "A" is set according to the following equation.

$$AI = \frac{i|BC''|}{(n-i)|AD| + i|BC''|} AB \qquad (4)$$

where "n" denotes the cell arrangement number or the bar-code stack number.

Similarly, division points can be set on the side DC. A line parallel with the side AD is drawn from the end C of the side DC, and the intersection of this line and the side AB is denoted by the character B". The length of the line segment B"C is calculated. Division points on the side DC are set in response to the length of the line segment B"C and the length of the side AD. Specifically, the position DI of an i-th (i=0, 1, 2, ..., n) division point "I" in the order as viewed from the apex "D" is set according to the following equation.

$$DI = \frac{i|B''C|}{(n-i)|AD| + i|B''C|} DC \qquad (5)$$

where "n" denotes the cell arrangement number or the bar-code stack number.

In general, major factors affecting a distortion of a side AB of a two-dimensional code area ABCD are thought to be ① the ratio in length between two sides AD and BC adjacent to the side AB, and ② the slope of a side DC opposite to the side AB. In the fourth specific embodiment of this invention, a trapezoid is used on the premise that a variation in the ratio ① is small.

Then, division points are set on opposite sides of the trapezoid. Subsequently, inspection lines are set which connect corresponding ones of the division points. Errors of cell arrangement positions or bar-code arrangement positions in the two-dimensional code area can be calculated on the basis of the inspection lines. Thus, even in the case where an image of a two-dimensional code is distorted due to a slant relation between the CCD area sensor 12 (see FIG. 12) and a plane of the two-dimensional code, the two-dimensional code can be accurately recognized and decoded. The inspection lines are set by a simple calculation step corresponding to an operation of connecting the division points. Therefore, the time taken to set the inspection lines is remarkably shorter than that in a prior-art method having an angle calculation step for each inspection line. Thus, even in the case where an image of a two-dimensional code is distorted, the two-dimensional code can be accurately decoded in a short time.

Fifth Specific Embodiment

A fifth specific embodiment of this invention is similar to one of the first, second, third, and fourth specific embodiments thereof except for design changes indicated hereinafter. The fifth specific embodiment of this invention is directed to an apparatus for reading a two-dimensional code of either a cell matrix type or a bar-code stack type.

In the apparatus according to the fifth specific embodiment of this invention, the image represented by the digital image data in the memory 20 (see FIG. 12) is scanned. Then, a determination is made as to whether the two-dimensional code is of the cell matrix type or the bar-code stack type on the basis of the scanned image. For the two-dimensional code of the cell matrix type, the decoding process designed for the cell matrix type is implemented. For the two-dimensional code of the bar-code stack type, the decoding process designed for the bar-code stack type is implemented.

Sixth Specific Embodiment

Figure 19:
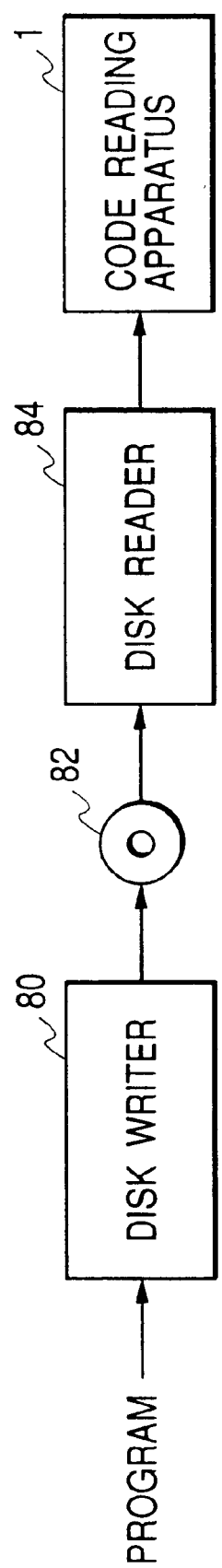
FIG. 19 is a block diagram of a system according to a sixth specific embodiment of this invention.

FIG. 19 shows a system according to a sixth specific embodiment of this invention which is similar to one of the first, second, third, fourth, and fifth specific embodiments thereof except for design changes indicated hereinafter.

The system of FIG. 19 includes a disk writer 80 fed with a signal representative of a program from, for example, a computer. The device 80 writes the signal of the program on a recording disk 82 such as a magnetic disk, a magneto-optical disk, or an optical disk.

A disk reader 84 drives the recording disk 82, and reads out the signal of the program therefrom. The disk reader 84 outputs the signal of the program to the two-dimensional code reading apparatus 1. In the apparatus 1, the signal of the program is stored into the RAM within the control circuit 10 (see FIG. 12). The control circuit 10 operates in accordance with the program in the RAM. The program is similar to that in one of the first, second, third, fourth, and fifth specific embodiments of this invention.

What is claimed is:

1. A method of reading a two-dimensional code, comprising the steps of:
   taking an image of a region including the two-dimensional code;
   determining a two-dimensional code area in the image, the two-dimensional code area corresponding to the two-dimensional code;
   setting inspection lines connecting opposite sides in two pairs among four sides indicating boundaries of the two-dimensional code area; and
   reading information from the two-dimensional code area on the basis of the inspection lines;
   wherein the inspection-line setting step comprises setting division points on the opposite sides based on a ratio in length between sides adjacent to the opposite sides and a number of arrangements of cells in the two-dimensional code, and setting the inspection lines which connect corresponding ones of the division points.

2. A method of reading a two-dimensional code of a cell matrix, comprising the steps of:
   taking an image of a region including the two-dimensional code;
   determining a two-dimensional code area in the image, the two-dimensional code area corresponding to the two-dimensional code;
   setting inspection lines connecting opposite sides in two pairs among four sides indicating boundaries of the two-dimensional code area; and
   reading information from the two-dimensional code area on the basis of the inspection lines;
   wherein the inspection-line setting step comprises detecting a specified pattern in the two-dimensional code area, calculating positions of centers of given cells in the two-dimensional code on the basis of the specified pattern, setting the calculated center positions as division points on first one of the opposite sides, setting division points on second one of the opposite sides based on a ratio in length between sides adjacent to the opposite sides and a number of arrangements of cells in the two-dimensional code, and setting the inspection lines which connect corresponding ones of the division points.

3. A method of reading a two-dimensional code, comprising the steps of:
   taking an image of a region including the two-dimensional code;
   determining a two-dimensional code area in the image, the two-dimensional code area corresponding to the two-dimensional code;
   setting inspection lines connecting opposite sides in two pairs among four sides indicating boundaries of the two-dimensional code area; and
   reading information from the two-dimensional code area on the basis of the inspection lines;
   wherein the inspection-line setting step comprises setting division points on the opposite sides in response to a ratio in length between a reference adjacent side connecting first ends of the opposite sides and a line segment parallel with the reference adjacent side and extending from a second end of first one of the opposite sides to second one of the opposite sides, and in response to a number of arrangements of cells in the two-dimensional code, and setting the inspection lines which connect corresponding ones of the division points.

4. A two-dimensional code reading apparatus comprising:
   image taking means for taking an image of a region including a two-dimensional code of a bar-code stack;
   area determining means for determining a two-dimensional code area in the image taken by the image taking means, the two-dimensional code area corresponding to the two-dimensional code;
   inspection line setting means for setting inspection lines connecting opposite sides in one pair among four sides indicating boundaries of the two-dimensional code area determined by the area determining means; and
   bar-code reading means for scanning the two-dimensional code area along the inspection lines set by the inspection line setting means, and reading bar-code information from the two-dimensional code area;
   wherein the inspection line setting means comprises means for setting division points on the opposite sides in response to a ratio in length between sides adjacent to the opposite sides and a number of stacked bar codes in the two-dimensional code, and means for setting the inspection lines which connect corresponding ones of the division points.

5. A two-dimensional code reading apparatus comprising:
   image taking means for taking an image of a region including a two-dimensional code of a cell matrix;
   area determining means for determining a two-dimensional code area in the image taken by the image taking means, the two-dimensional code area corresponding to the two-dimensional code;
   inspection line setting means for setting inspection lines connecting opposite sides in two pairs among four sides indicating boundaries of the two-dimensional code area determined by the area determining means; and
   cell reading means for determining intersections of the inspection lines set by the inspection line setting means to be cell positions, and detecting types of cells in the two-dimensional code in response to the determined cell positions;
   wherein the inspection line setting means comprises means for setting division points on the opposite sides in response to a ratio in length between sides adjacent to the opposite sides and a number of arrangements of cells in the two-dimensional code, and means for setting the inspection lines which connect corresponding ones of the division points.

6. A two-dimensional code reading apparatus as recited in claim 4, wherein the inspection line setting means comprises means for detecting a specified pattern in the two-dimensional code area, means for calculating positions of centers of given cells in the two-dimensional code on the basis of the specified pattern, means for setting the calculated center positions as division points on first one of the opposite sides, means for setting division points on second one of the opposite sides in response to a ratio in length between sides adjacent to the opposite sides and a number of arrangements of cells in the two-dimensional code, and means for setting the inspection lines which connect corresponding ones of the division points.

7. A two-dimensional code reading apparatus as recited in claim 6, wherein the inspection line setting means comprises means for scanning a group of pixels corresponding to a dark portion in a timing cell array in the two-dimensional code area along a main scanning direction and a sub scanning direction, means for selecting two outermost pixels from the scanned pixel group in the main scanning direction, means for selecting two outermost pixels from the scanned pixel group in the sub scanning direction, means for calculating a position intermediate among the selected outermost pixels in the main scanning direction and the sub scanning direction, and means for using the calculated intermediate position as one of the calculated center positions.

8. A two-dimensional code reading apparatus as recited in claim 6, wherein the inspection line setting means comprises means for calculating coordinates of centers of dark portions in a timing cell array in the two-dimensional code area, means for calculating coordinates of centers of bright portions in the timing cell array in the two-dimensional code area from the calculated coordinates of the centers of the dark portions, and means for using the calculated coordinates of the centers of the dark portions and the bright portions as the calculated center positions.

9. A two-dimensional code reading apparatus comprising:

image taking means for taking an image of a region including a two-dimensional code of a cell matrix;

area determining means for determining a two-dimensional code area in the image taken by the image taking means, the two-dimensional code area corresponding to the two-dimensional code;

inspection line setting means for setting inspection lines connecting opposite sides in two pairs among four sides indicating boundaries of the two-dimensional code area determined by the area determining means; and cell reading means for determining intersections of the inspection lines set by the inspection line setting means to be cell positions, and detecting types of cells in the two-dimensional code in response to the determined cell positions;

wherein the inspection line setting means comprises means for setting division points on the opposite sides in response to a ratio in length between a reference adjacent side connecting first ends of the opposite sides and a line segment parallel with the reference adjacent side and extending from a second end of first one of the opposite sides to second one of the opposite sides, and in response to a number of arrangements of cells in the two-dimensional code, and means for setting the inspection lines which connect corresponding ones of the division points.

10. A method of reading a two-dimensional code, comprising the steps of:

taking an image of a region including the two-dimensional code;

determining a two-dimensional code area in the image, the two-dimensional code area corresponding to the two-dimensional code;

setting inspection lines connecting opposite sides in one pair among four sides indicating boundaries of the two-dimensional code area; and reading information from two-dimensional code area on the basis of the inspection lines;

wherein the inspection-line setting step comprises setting division points on the opposite sides and a number of stacked bar codes in the two-dimensional code, and setting the inspection lines which connect corresponding ones of the division points.

11. A method of reading a two-dimensional code, comprising the steps of:

taking an image of a region including the two-dimensional code;

determining a two-dimensional code area in the image, the two-dimensional code area corresponding to the two-dimensional code;

setting inspection lines connecting opposite sides in one pair among four sides indicating boundaries of the two-dimensional code area; and reading information from the two-dimensional code area on the basis of the inspection lines;

wherein the inspection-line setting step comprises setting division points ion the opposite sides in response to a ratio in length between a reference adjacent side connecting first ends of the opposite sides and a line segment parallel with the reference adjacent side and extending form a second end of first one of the opposite sides to second one of the opposite sides, and in response to a number of stacked bar codes in the two-dimensional code, and setting the inspection lines which connect corresponding ones of the division points.

* * * * *